US012220711B2

(12) United States Patent
Swensen et al.

(10) Patent No.: US 12,220,711 B2
(45) Date of Patent: Feb. 11, 2025

(54) FLOTATION SEPARATION OF FINE COAL PARTICLES FROM ASH-FORMING PARTICLES

(71) Applicant: Omnis Mineral Technologies, LLC, Santa Barbara, CA (US)

(72) Inventors: James S. Swensen, Santa Barbara, CA (US); Simon K. Hodson, Santa Barbara, CA (US); Jonathan K. Hodson, Santa Barbara, CA (US)

(73) Assignee: Omnis Mineral Technologies, LLC, Santa Barbara, CA (US)

( * ) Notice: Subject to any disclaimer, the term of this patent is extended or adjusted under 35 U.S.C. 154(b) by 684 days.

(21) Appl. No.: 16/909,452

(22) Filed: Jun. 23, 2020

(65) Prior Publication Data

US 2020/0316614 A1 Oct. 8, 2020

Related U.S. Application Data

(62) Division of application No. 14/495,657, filed on Sep. 24, 2014, now abandoned.

(51) Int. Cl.
*B03D 1/02* (2006.01)
*B03D 1/14* (2006.01)
(Continued)

(52) U.S. Cl.
CPC ............. *B03D 1/025* (2013.01); *B03D 1/028* (2013.01); *B03D 1/1456* (2013.01); *B03D 1/24* (2013.01);
(Continued)

(58) Field of Classification Search
CPC ...................................................... B03D 1/025
See application file for complete search history.

(56) References Cited

U.S. PATENT DOCUMENTS

| | | | |
|---|---|---|---|
| 2,778,499 | A | 1/1957 | Chamberlain et al. |
| 4,412,839 | A | 11/1983 | Taylor |

(Continued)

FOREIGN PATENT DOCUMENTS

| | | |
|---|---|---|
| AU | B2847192 | 11/1995 |
| CN | 200954465 Y | 10/2007 |

(Continued)

OTHER PUBLICATIONS

Flint, I.M. et al., “Froth Processes and the Design of Column Flotation Cells,” 2000, pp. 1521-1527, Canadian Process Technologies Inc., Vancouver, B.C., Canada.

(Continued)

*Primary Examiner* — Peter Keyworth
(74) *Attorney, Agent, or Firm* — KIRTON McCONKIE; Evan R. Witt

(57) ABSTRACT

Coal fines are processed by flotation separation to separate coal particles from ash-forming mineral content particles. Coal fines are mixed water under high shear mixing conditions to form an aqueous slurry of coal fines containing between 15 wt. % and 55 wt. % coal fines. The aqueous slurry is introduced into a coal flotation cell to separate coal particles from ash-forming mineral content particles by flotation separation, wherein the coal fines have a particle size less than 100 μm, and more preferably less than 50 μm. Bubbles are generated in the coal flotation cell having a bubble size and bubble quantity selected to float the coal particles and to form a coal-froth containing at least 15 wt. % solid particles. The solid particles include coal particles and ash-forming mineral content particles. The coal-froth is collected for further processing.

11 Claims, 14 Drawing Sheets

(51) Int. Cl.

| | |
|---|---|
| ***B03D 1/24*** | (2006.01) |
| ***C10L 1/32*** | (2006.01) |
| ***C10L 5/04*** | (2006.01) |
| ***C10L 5/36*** | (2006.01) |
| ***C10L 9/00*** | (2006.01) |

(52) U.S. Cl.

CPC ................. *C10L 1/326* (2013.01); *C10L 5/04* (2013.01); *C10L 5/366* (2013.01); *C10L 9/00* (2013.01); *B03D 2203/08* (2013.01); *C10L 2250/06* (2013.01); *C10L 2290/54* (2013.01)

(56) References Cited

U.S. PATENT DOCUMENTS

| | | | | |
|---|---|---|---|---|
| 4,455,148 | A | 6/1984 | Nagata et al. | |
| 4,477,338 | A | 10/1984 | Hellmann | |
| 4,551,179 | A | 11/1985 | Mark | |
| 4,620,672 | A | 11/1986 | Leibson et al. | |
| 4,712,742 | A * | 12/1987 | Ogawa | C10L 1/326 44/280 |
| 4,762,526 | A | 8/1988 | Funaji et al. | |
| 4,797,550 | A | 1/1989 | Nelson et al. | |
| 4,826,588 | A | 5/1989 | Klimpel et al. | |
| 4,915,706 | A | 4/1990 | Daley et al. | |
| 4,966,687 | A | 10/1990 | Trigg | |
| 4,981,582 | A | 1/1991 | Yoon et al. | |
| 5,167,798 | A | 12/1992 | Yoon et al. | |
| 5,307,937 | A | 5/1994 | Hutwelker | |
| 5,397,001 | A | 3/1995 | Yoon et al. | |
| 5,577,669 | A | 11/1996 | Vujnovic | |
| 5,587,085 | A | 12/1996 | Yoon et al. | |
| 5,643,459 | A | 7/1997 | Hubred et al. | |
| 5,814,210 | A | 9/1998 | Yoon et al. | |
| 6,526,675 | B1 | 3/2003 | Yoon | |
| 6,799,682 | B1 | 10/2004 | Yoon | |
| 6,855,260 | B1 | 2/2005 | Yoon | |
| 7,153,105 | B2 | 12/2006 | Koelzer et al. | |
| 7,163,105 | B2 | 1/2007 | Jameson et al. | |
| 8,302,325 | B2 | 11/2012 | Harsh et al. | |
| 8,398,947 | B2 | 3/2013 | Yoon et al. | |
| 8,678,193 | B2 | 3/2014 | Grossmann et al. | |
| 2003/0085184 | A1 | 5/2003 | Mullins | |
| 2008/0251427 | A1 | 10/2008 | Mankosa et al. | |
| 2009/0194466 | A1 | 8/2009 | Hines et al. | |
| 2013/0111808 | A1 | 5/2013 | Yoon et al. | |
| 2013/0312946 | A1 | 11/2013 | Chan et al. | |

FOREIGN PATENT DOCUMENTS

| | | | |
|---|---|---|---|
| CN | 102319765 | A | 1/2012 |
| GB | 2143155 | A | 2/1985 |
| RU | 1813019 | A3 | 4/1993 |
| WO | 0160523 | A1 | 8/2001 |
| WO | 2001060523 | A1 | 8/2001 |
| WO | 2009033203 | A1 | 3/2009 |

OTHER PUBLICATIONS

Tao, D., “Role of Bubble Size in Flotation of Coarse and Fine Particles—A Review,” Separation Science and Technology, 2004, pp. 741-760, 39:4, Dept. of Mining Engineering, University of Kentucky, Lexington, Kentucky, USA.

Ahmed, N. et al., “The Effect of Bubble Size on the Rate of Flotation of Fine Particles,” International Journal of Mineral Processing, 1985, pp. 195-215, 14, Elsevier Science Publishers B.V., Amsterdam, The Netherlands.

Yoon, R.H. et al., “The Effect of Bubble Size on Fine Coal Flotation,” Coal Preparation, 1986, pp. 179-192, vol. 2, Gordon and Breach, Science Publishers S.A. and OPA Ltd, United Kingdom.

Vapur, Huseyin et al., “Coal Flotation Optimization Using Modified Flotation Parameters and Combustible Recovery in a Jameson Cell,” Energy Conversion and Management, 2010, pp. 1891-1897, 51, Cukurova University, Mining Engineering Department et al., Turkey.

Peng, Felicia F., “The Development and Optimization of Column Flotation with Pico-Nano Bubble Generation for the Operation of Coarse and Ultrafine Coal Separation,” Coal and Energy Research Bureau Final Report No. 2013-005, 2013, West Virginia University, USA.

Patwardhan, A. et al., “Development of a Carrying-Capacity Model for col. Froth Flotation,” International Journal of Mineral Processing, 2000, pp. 275-293, 59, Department of Mining and Mineral Resources Engineering, Southern Illinois University, Illinois, USA.

Klima, Mark S. et al., Challenges in Fine Coal Processing, Dewatering, and Disposal, 2012, book, pp. 159-185; SME.

“Cavitation Sparging System Enhanced col. Flotation,” brochure, Canadian Process Technologies Inc., Canada.

“Cavitation Sparging System,” brochure, Canadian Process Technologies Inc., Canada.

Oder, R.R., “Pre-Combustion Removal of Ash-Forming Minerals from Coal at Pulverized Coal Fired Power Plants,” 2000, EXPORTech Company, Inc., Proceedings of the Engineering Foundation Conference, Park City, Utah, USA.

Dr. Mankosa, M., et al., “A Comeback for Fine Coal Recovery,” 2001, pp. 1-4, World Coal, Canada.

Canadian Process Technologies Inc., corporate brochure, Canada.

Canadian Process Technologies Inc., “Coal Pro,” brochure, Canada.

Ali, Z. et al., “Innovative Design of Fine Coal Cleaning Circuits for Improved Sulfur Rejection,” 2013, presented at Coal Prep 2013 in Lexington, Kentucky, USA, www.coalprepshow.com.

Keller Jr., D.V., “Separation of Mineral Matter from Pittsburgh Coal by Wet Milling,” ACS Symposium Series, 1986, pp. 473-784, American Chemical Society, Washington ,DC, USA.

Keller Jr., D.V., et al. “The Demineralization of Coal Using Selective Agglomeration by the T-Process,” Coal Preparation, 1990, pp. 1-17, Gordon and Breach Science Publishers S.A., United Kingdom.

Wyslouzil, Harold E., “Mineral Producers Improve Plant Performance Using col. Flotation Technology,” Canadian Process Technologies Inc., Vancouver, B.C., Canada.

Chemical—Mechanical Dewatering of Fine Coal; pp. 1-46.

Kiser, Michael, et al., “StackCell Flotation—A New Technology for Fine Coal Recovery,” pp. 1-13; Mining& Minerals Engineering, Virginia Tech, Blacksburg, Virginia, USA.

Klima, Mark S. et al., Challenges in Fine Coal Processing, Dewatering, and Disposal, 2012, book, pp. 187-209; SME.

Mavros, P et al., “A Study of Flotation Column Performance for the Recovery of Fine Particles.”, Separation Science and Technology., (1990), vol. 25, No. 1&@, pp. 155-170.

“Process characteristics of heterogeneous fine mud in the coal flotation”, Gui Xiahui et al., Journal of Coal Science, vol. 37, No. 2, pp. 301-309, Feb. 28, 2012.

Wilson, Robert P., Clean Coal Diesel Demonstration Project—Final Report, Tiax LLC, Oct. 31, 2013.

Fan, Maoming et al., Effect of nanobubbles on the flotation of different sizes of coal particle, Minerals & Metallurgical Processing, 2013, vol. 30, No. 3, pp. 157-161.

Jameson, G. J. et al., Operating Experiences with Jameson Cells at Newlands Coal Pty Ltd, Queensland, The Australian Coal Preparation Society, ISBN 0-646-04287-4, May 1991.

Osborne, Dave. The coal handbook; Towards cleaner production; vol. 2: Coal utilisation; Woodhead Publishing Limited, 2013.

* cited by examiner

FLOTATION SEPARATION OF FINE COAL PARTICLES FROM ASH-FORMING PARTICLES

CROSS-REFERENCE TO RELATED APPLICATION

This application is a divisional of prior application Ser. No. 14/495,657, filed Sep. 24, 2014, and entitled FLOTATION SEPARATION OF FINE COAL PARTICLES FROM ASH-FORMING PARTICLES, which application is incorporated by reference.

BACKGROUND OF THE INVENTION

This disclosure relates to systems and methods for the flotation separation of fine coal particles from ash-forming mineral content particles, thereby enabling the recovery of fine coal particles to be processed into upgraded, commercially valuable coal products.

BACKGROUND

Coals are ranked primarily based on the carbon makeup of the material (e.g. macerals and fixed carbon vs. volatile matter) and BTU value as a function of the ash-forming mineral and moisture content:

Anthracite is the highest ranking coal and is used by the steel industry as a coke substitute through processes such as pulverized coal injection in metallurgical coal applications. It is a dense, hard rock with a metallic luster. It contains between 85% and 98% fixed carbon by weight. Anthracite coal contains approximately 14,000+ BTU/lb (32+MJ/Kg).

Bituminous is the second highest ranking coal and used for both electric power generation and coke production. It is a relatively hard coal that is usually black, sometimes dark brown. It contains between 45% and 85% fixed carbon by weight. Bituminous coal contains approximately 9,000-13,000 BTU/lb (21-30 MJ/Kg).

Sub-bituminous is a lower ranking coal used mainly for electric power generation. It contains between 35% and 45% fixed carbon by weight. Sub-bituminous coal contains approximately 4,000-9,000 BTU/lb (9-21 MJ/Kg).

Lignite is the lowest ranking coal used exclusively for electric power generation. It contains between 15% and 35% fixed carbon by weight. Lignite coal produces less than 4,000 BTU/lb (<9 MJ/Kg).

Metallurgical coal is sometimes referred to as coking coal because it is used in the process of creating coke necessary for iron and steel-making. Thermal coal is sometimes called steam coal because it is used to fire power plants that produce steam for electricity and industrial uses.

Coal is one of the most important energy sources in the world. Approximately 1 billion tons of coal are produced in the United States each year. Coal is typically crushed. During the mining and crushing operation, coal waste fines, also known as coal dust, are generated. Furthermore, coal is typically washed prior to transport to remove surface dust. Coal fines are defined as coal that is less than 1 millimeter in size, and coal ultrafines are defined as coal that is less than 500 microns in size. The current industrial process to recover coal particles less than 1 mm in size is more expensive than other coal processing. The smaller the particles, the greater the processing cost. Further, there are no current commercial processes to recover and sell particles less than 100 microns (0.1 mm). Approximately 200 to 300 million tons of coal waste fines are produced and impounded each year in the United States. It is estimated that over 3 billion tons of coal are produced in China each year, and over 500 million tons of associated coal fines are impounded each year.

In summary, there are many grades of coal based on the ash content, moisture, macerals, fixed carbon, and volatile matter. Regardless of grade however, the energy content of coal is directly correlated to its moisture and ash-forming mineral contents. The lower the ash-forming mineral and moisture content of the coal, the greater the energy content and the higher the value of the coal. Any coal of any grade can be improved through reducing the ash-forming mineral content of said coal.

While coal fines are the same chemical composition of the larger-size mined coal product, it is considered waste because the conventional coal recovery process is not designed to handle small particles. The waste coal fines are left unused because they are typically too wet to burn, too dirty to be worth drying, and too fine to transport. There are billions of tons of waste coal fines impounded at thousands of coal mines throughout the world. It is estimated there are over 10 billion tons in the United States and China, and billions of additional tons in Australia, India, Indonesia, Russia, Columbia and other countries.

Coal fines generally contain three components: (1) coal particles (carbon); (2) ash-forming mineral content particles, such as clay, limestone, and sand; and (3) water. These coal fines typically have an ash-forming mineral content of greater than 30%, by weight (about 15% by volume), and a moisture content of greater than 30%, by weight. They are often impounded as environmentally hazardous.

Of particular challenge in the coal industry is the burning of coal with typical ash-forming mineral content. The mineral content components are the major source of most harmful emissions, such as $SO_x$, and reduce energy value and heat transfer efficiency. Reducing the ash-forming mineral content to less than about 5% by weight in the coal would eliminate approximately 2/3 of the harmful emissions. This cleaner burning coal would be a significant advancement in the energy sector.

While coal fines separation, classification and drying technologies are known, they are too inefficient and expensive with particles less than 150 microns to be commercially feasible. An efficient process to convert coal fines into an economical commercial product has not been developed. Further significant money is being wasted in the transportation and handling of the moisture fraction and the ash-forming mineral fraction of the coal.

Commercial flotation separation as a means to separate coal particles from ash-forming mineral content particles has been practiced for decades. Coal particles free from ash-forming mineral content particles is essentially carbon. In general, a flotation cell has bubble making units at the bottom of the cell. Water fills as much as 90% or more of the volume of the flotation cell. The water is aerated with the bubbles forming a water-bubble region. The entirety of the water-bubble region is often called the pulp of the flotation cell. A small quantity of frother to aid in fine air bubble formation is mixed into the water to stabilize bubble size in the pulp. After the frother is added, bubble size and quantity is determined by the method by which bubbles are made. A slurry of the coal fines is pumped into the pulp region of the flotation cell at some point above the bubble generators. Separation of coal particles from ash-forming mineral content particles takes place in the pulp. The region above the pulp where bubbles carry the floated coal particles is called the froth region. At the boundary between the pulp and froth regions, small bubbles at the water surface coalesce into larger bubbles forming a coal-froth. The froth spills over into a collection system that gravity feeds into a collection hopper [Flint 2000].

The separation process for coal particles from ash-forming mineral content particles in flotation separation can be described as follows. Coal particles that are predominantly non-oxidized carbon are hydrophobic by nature. A collector may be added to the slurry to coat the coal particles and increase the natural hydrophobicity of the coal particles' surface. The skin of the bubbles is hydrophobic. Coal particles become attached to rising bubbles via hydrophobic attraction. Bubbles with sufficient buoyancy lift the attached coal particles upward through the pulp in the flotation cell to the boundary between the pulp and the froth region, whereupon the bubbles coalesce into larger bubbles called coal-froth. The predominantly ash-forming mineral content particles are hydrophilic in nature and do not float with the bubbles. Therefore, most of the ash-forming mineral content particles remain suspended in the water of the pulp. Larger ash-forming mineral content particles and coal particles that are too large to float fall to the bottom of the flotation cell against the upward current of bubbles as sediment. Thus, it is useful to grind or crush the particles to the correct size. In the froth, the coal particles remain attached to the larger froth bubbles. As more bubbles with attached coal arrive at the boundary between the pulp and the coal-froth, the formation of more froth produces a net upward force that pushes the coal-froth mass upwards and out of the flotation column. Three metrics for characterizing the flotation separation of coal fines are flotation efficiency, combustible recovery, and flotation rate.

Flotation efficiency is the weight percent of coal particles in the coal-froth on a dry basis. Coal-froth consists of bubbles, coal particles on the bubbles, and water from the pulp that is entrained with the froth. The water portion from the pulp contains suspended ash-forming mineral content particles and some coal particles that are in suspension. The more water from the pulp that is included in the coal-froth, the more ash-forming mineral content particles become included in the coal-froth product. Consequently, a drier coal-froth has a higher flotation efficiency because it has less water from the pulp and the suspended ash-forming mineral content particles in the water.

Combustible recovery reports carbon floated in the coal-froth divided by carbon input in the slurry. For example a 90% combustible recovery indicates that 90% of the mass of the carbon particles in the slurry overflow the flotation column in the coal-froth and are collected.

The rate at which the coal-froth product exits a flotation cell is called the flotation rate and is expressed in terms of metric tons of dry froth per hour (MTPH) divided by the cross sectional area of the flotation column (MTPH/$m^2$). The maximum flotation rate that can exist is the carrying capacity of the flotation cell.

Flotation separation is a product of at least four probabilities: the probability of a coal particle colliding with a bubble, the probability of a coal particle attachment to a bubble upon collision, the probability of detachment from a bubble due to turbulence, and the probability of particle levitation through the froth to the collection zone [Klima 2012]. As particle size increases, the probabilities of attachment, detachment, and levitation decrease while probability of collision increases. The net result is that combustible recovery and flotation rate increase with decreasing particle size [Tao 2004]. An added benefit to reducing the coal particle size is that the smaller the coal particle is, the less entrained ash-forming mineral content in the coal particle, thus increasing flotation efficiency.

The general view is that combustible recovery decreases significantly for particle sizes below 0.05 mm and above 0.5 mm [Yoon 1995 and Jameson 2007]. It has been demonstrated that as bubble size decreases, flotation rate increases at a rapid rate [Ahmed 1985, Yoon 1986]. Thus, an ideal flotation system would have both small particle sizes (e.g. ultrafine coal less than 0.05 mm in diameter) and small bubble sizes, e.g. bubbles just buoyant enough to lift the coal particles through the flotation cell.

As stated above, theory suggests that combustible recovery and flotation rate should increase with smaller particles and smaller bubbles. However, reports in literature and patents have not demonstrated theory, instead they show combustible recovery increased with increasing particle size [Yoon 1995, Vapur 2010, Peng 2013]. Combustible recoveries up to 90% have been demonstrated, but with ash contents greater than 10 wt. % [Yoon 1995, Vapur 2010, Peng 2013]. In general, flotation rate (and in like manner carrying capacity) are reported to decrease with decreasing particle size [Patwardhan 2000].

In summary, the coal industry has designed their process with particles less than 1 mm discarded as waste. This waste accounts for 20% to 30% of all coal production. Even with recent advances in some coal processes, including attempts to recover coal fines via coal flotation processes, the coal industry does not have an effective process for upgrading and handling coal fines less than 500 microns (0.5 mm), more specifically less than 300 microns (0.3 mm), less than 150 microns (0.15 mm), less than 100 microns (0.1 mm), and certainly less than 50 microns (0.05 mm). These massive amounts of fine waste are inefficient and are an environmental and disposal problem.

It would be a significant advancement in the art to provide an efficient process to separate fine coal particles from ash-forming mineral content particles, thereby eliminating an environmental hazard and creating a commercially valuable coal product. It would be a further advancement to provide a process to separate fine coal particles from ash-forming mineral content particles having improved flotation efficiency and improved combustible recovery. It would be another advancement to provide a process to separate fine coal particles from ash-forming mineral content particles that provides an improved capture rate of fine particles with average size less than 300 microns.

BACKGROUND REFERENCES

[1] I. M. Flint and M. A. Burstein, "Encyclopedia of Separation Science," in *Encyclopedia of Separation Science*, I. D. Wilson, Ed. Elsevier, 2000, pp. 1521-1527.

[2] M. S. Klima, B. J. Arnold, and P. J. Bethell, *Challenges in Fine Coal Processing, Dewatering, and Disposal*. Englewood, CO: Society for Mining, Metallurgy, and Exploration, Inc., 2012.

[3] D. Tao, "Role of Bubble Size in Flotation of Coarse and Fine Particles—A Review," *Sep. Sci. Technol.*, vol. 39, no. 4, pp. 741-760, January 2005.

[4] R.-H. Yoon, G. T. Adel, and G. H. Luttrell, "Apparatus for the separation of hydrophobic and hydrophilic particles using microbubble column flotation together with a process and apparatus for generation of microbubbles," U.S. Pat. No. 5,397,001, 1995.

[5] G. J. Jameson and N. W. A. Lambert, "Froth flotation process and apparatus," U.S. Pat. No. 7,163,105 B2, 2007.

[6] N. Ahmed and G. J. Jameson, "The effect of bubble size on the rate of flotation of fine particles," *Int. J. Miner. Process.*, vol. 14, no. 3, pp. 195-215, April 1985.
[7] R.-H. Yoon and G. H. Luttrell, "The Effect of Bubble Size on Fine Coal Flotation," *Coal Prep.*, vol. 2, no. 3, pp. 179-192, January 1986.
[8] H. Vapur, O. Bayat, and M. Uçurum, "Coal flotation optimization using modified flotation parameters and combustible recovery in a Jameson cell," *Energy Conyers. Manag.*, vol. 51, no. 10, pp. 1891-1897, October 2010.
[9] F. F. Peng and Y. Xiong, "The Development and Optimization of Column Flotation with Pico-Nano Bubble Generation for the Operation of Coarse and Ultrafine Coal Separation," 2013.
[10] A. Patwardhan and R. Honaker, "Development of a carrying-capacity model for column froth flotation," *Int. J. Miner. Process.*, vol. 59, no. 4, pp. 275-293, July 2000.

BRIEF SUMMARY OF THE INVENTION

This disclosure relates to systems and methods for the flotation separation of fine coal particles from ash-forming mineral content particles. As used herein, coal fines include coal that has a particle size less than about 750 microns (μm) or an average particle size less than 500 μm in diameter. Coal fines may comprise agglomerated particles of coal and particles of ash-forming mineral content. Thus, coal fines include particles of coal and particles of ash-forming mineral content. The particles of coal comprise carbon (including the organic maceral content of the coal). The particles of ash-forming mineral content contribute to the mineral or inorganic content of coal.

A process is disclosed for separating ash-forming mineral content particles from coal particles. In one non-limiting embodiment, the process includes the step of obtaining a quantity of coal fines. The quantity of coal fines may be dry or wet. The quantity of coal fines is mixed with water under high shear or high energy mixing conditions to form an aqueous slurry of coal fines. High shear or high energy mixing conditions serve to break up agglomerates of smaller particles of coal fines into individual particles of coal and ash-forming mineral content to increase the total solid particle surface area and to suspend and disperse the particles throughout the slurry. Thus, the aqueous slurry of coal fines is a mixture of water, discrete coal particles, and discrete ash-forming mineral content particles.

Non-limiting examples of high shear mixing include a combination of a paddle mixer and a chopper mixer. The paddle mixer may have a tip speed greater than 0.5 m/s. The chopper mixer may have a tip speed greater than 11.5 m/s. Non-limiting examples of high energy mixing include ultrasonication. Ultra-sonication may operate at a frequency between 10 and 50 Hz. The Ultra-sonication may also operate in combination with a paddle mixer to provide suitable dispersion of the coal fines in water. The paddle mixer may have a tip speed greater than 0.5 m/s.

Due to the high shear or high energy mixing conditions, the apparent or actual size of the coal fines may be reduced. While raw or unprocessed coal fines may have a particle size less than 750 microns (μm) in diameter, in some embodiments, the coal fines, including discrete coal particles and ash-forming mineral content particles, in the aqueous slurry have a particle size less than about 500 μm. In some embodiments, the coal fines, including discrete coal particles and ash-forming mineral content particles, in the aqueous slurry have a particle size less than about 300 μm. In other embodiments, the coal fines in the aqueous slurry have a particle size less than about 150 μm. In yet other embodiments, the coal fines in the aqueous slurry have a particle size less than about 100 μm. In still other embodiments, the coal fines in the aqueous slurry have a particle size less than about 50 μm.

In one embodiment, the aqueous slurry of coal fines contains greater than 15 wt. % coal fines. In another embodiment, the aqueous slurry of coal fines contains greater than 25 wt. % coal fines. In still another embodiment, the aqueous slurry of coal fines contains greater than 35 wt. % coal fines. In yet another embodiment, the aqueous slurry of coal fines contains greater than 45 wt. % coal fines. In yet another embodiment, the aqueous slurry of coal fines contains about 40±15 wt. % coal fines.

An aqueous slurry of coal fines having solids content greater than 15 wt. % is a significant improvement compared to conventional slurries. Kilma discloses typical slurry solid content between 2.5 and 6.0 wt. %, but he mentions some cells with fees between 10 and 14 wt. %. [Kilma 2012]. Peng discloses slurries between 2 and 10 wt. % with 3.5 wt. % being optimal. [Peng 2013]. These slurries are prepared by washing the coal fines though one or more screens. The reason the prior art slurries are so low in solid content is because they are made by washing the fines through screens with a lot of wash water. [Kilma 2012] The high solid content slurry of discrete particles disclosed herein is made possible because of the high sheer or high energy mixing step which allows the discrete particles to flow through the vibratory deslime screen with the existing water in the slurry, thereby eliminating the need for significant dilution caused by wash water.

The aqueous slurry of coal fines is introduced into a coal flotation cell. Bubbles are generated in a quantity of water disposed in the coal flotation cell. The bubbles have a bubble size and bubble quantity selected to capture and float the coal particles of a particular size in the aqueous slurry thereby separating coal particles from ash-forming mineral content particles by flotation separation.

A coal-froth is formed in an upper region of the coal flotation cell. In one embodiment, the coal-froth comprises at least 15 wt. % solid particles, wherein the solid particles comprise coal particles and ash-forming mineral content particles. In another embodiment, the coal-froth comprises at least 20 wt. % solid particles. In yet another embodiment, the coal-froth comprises at least 25 wt. % solid particles. In still another embodiment, the coal-froth comprises at least 30 wt. % solid particles. In a further embodiment, the coal-froth comprises at least 35 wt. % solid particles. In a still further embodiment, the coal-froth comprises at least 40 wt. % solid particles. In another embodiment, the coal-froth comprises at least 45 wt. % solid particles. In yet another embodiment, the coal-froth comprises at least 50 wt. % solid particles. In contrast to the flotation separation process disclosed herein, typical coal-froth in commercially available coal flotation systems comprise 10 to 12 wt. % solid particles.

In one non-limiting embodiment, the collected solid particles in the coal-froth contain less than 8%, by weight, ash-forming mineral content particles and a corresponding flotation efficiency greater than 92%. In another embodiment, the collected solid particles in the coal-froth contain less than 5%, by weight, ash-forming mineral content particles and a corresponding flotation efficiency greater than 95%. In yet another embodiment, the collected solid particles in the coal-froth contain less than 3%, by weight, ash-forming mineral content particles and a corresponding flotation efficiency greater than 97%. In one non-limiting embodiment, the coal-froth contains less than 50 wt. % of the ash-forming mineral content of the aqueous slurry of coal fines. In another non-limiting embodiment, the coal-froth contains less than 40 wt. % of the ash-forming mineral content of the aqueous slurry. In a non-limiting embodiment, the coal-froth contains less than 30 wt. % of the ash-forming mineral content of the aqueous slurry. In another embodiment, the coal-froth contains less than 20 wt. % of the ash-forming mineral content of the aqueous slurry. In yet another embodiment, the coal-froth contains less than 10 wt. % of the ash-forming mineral content of the aqueous slurry.

As used herein, coal-froth includes the coal enriched combination of fine particles that overflows the top of the flotation cell. Typically coal-froth includes between 25 and 50 wt. % solids, based on the diameter of the flotation cell and air feed rate. The coal-froth commonly contains greater than 92 wt. % coal or carbon content on a dry basis. The coal-froth often contains 95 wt. % or more coal or carbon content on a dry basis, i.e., a flotation efficiency of 95% or more.

One non-limiting disclosed process for separating ash-forming mineral content particles from coal particles is preferably operated in a manner that maintains a relatively low height of the coal-froth, less than about 18 inches (0.45 m), in contrast to standard coal flotation cells in the industry that operate with a coal-froth height of 1 to 2 m. In the disclosed process, bubbles are generated within a quantity of water in a coal flotation cell. An aqueous slurry of coal fines comprising particles of coal and particles of ash-forming mineral content is introduced into the bubbles within the coal flotation cell in a manner that enables the bubbles to capture and float the coal particles and form a coal-froth. The height of the coal-froth is maintained at less than about 18 inches (0.45 m).

The coal-froth is collected for further processing. Such further processing includes, without limitation, dewatering to form a filter cake, pelletization of the filter cake to form coal pellets, and further processing of the coal pellets to render them moisture resistant, dust resistant, crush resistant, etc.

The disclosed flotation separation process is preferably operated such that the volume of aqueous slurry input to the flotation cell balances the volume of coal-froth output from the flotation cell. In this manner, the flotation cell can be operated under approximate steady-state conditions. As a consequence, the solids content of the aqueous slurry input to the flotation cell approximately balances the solids content of the coal-froth output. In contrast, typical commercially available coal flotation systems require a continuous liquid drainage of the flotation cell because the amount of liquid added to the cell exceeds its capacity and thereby creates the need to drain some of the pulp in order to maintain volume balance in the flotation cell.

In one disclosed embodiment, the flotation separation process includes the step of stopping the introduction of the aqueous slurry of coal fines into the coal flotation cell but continuing to generate bubbles and coal-froth for a period of time. This step of continuing to generate bubbles and coal-froth is sometimes referred to as a "clean-up" period. The length of the clean-up period may vary depending upon the quantity of coal particles remaining in the flotation cell that need to be floated after the introduction of the aqueous slurry of coal fines into the coal flotation cell is stopped. In one non-limiting embodiment, the clean-up period ranges between 15 seconds and 10 minutes. After the clean-up period, the quantity of water in the coal flotation cell is drained. This drained water or tailings may be further processed to separate and recover the solid particles from the drained water. The solid particles recovered from the drained water are predominantly ash-forming mineral content particles and a small fraction of oxidized coal particles.

In one disclosed embodiment, the flotation separation process includes the step of monitoring the content of solid particles in the quantity of water within the coal flotation cell. The solid particles include ash-forming mineral content particles and coal particles. When the content of solid particles in the quantity of water in the coal flotation cell exceeds a predetermined weight percentage, then the introduction of the aqueous slurry of coal fines into the coal flotation cell is stopped.

In one disclosed embodiment, the introduction of the aqueous slurry of coal fines into the coal flotation cell is stopped after a predetermined time period or after a predetermined quantity of aqueous slurry of coal fines is introduced into the coal flotation cell.

As used herein, tailings include the combination of water, ash-forming mineral content particles, and any un-floated coal particles drained from a flotation cell at the conclusion of a coal flotation cell operation cycle. Typically the tailings include between 2 and 6 wt. % solids. The ash-forming mineral content of the tailings may reach 90 wt. % or more ash-forming mineral content particles on a dry basis. The remaining 10 wt. % or so solids is coal or carbon residue left over from the flotation process.

The disclosed process may also include the step of recycling the clarified water from which the solid particles are recovered for use again in the coal flotation cell.

In one disclosed embodiment, the predetermined weight percentage of solid particles in the quantity of water is 7 wt. %. In another disclosed embodiment, the predetermined weight percentage of solid particles in the quantity of water is 5 wt. %. In yet another disclosed embodiment, the predetermined weight percentage of solid particles in the quantity of water is 3 wt. %. In a further disclosed embodiment, the predetermined weight percentage of solid particles in the quantity of water is between 3 wt. % and 6 wt. %.

In one aspect of the disclosed process, a flotation aid is added to the aqueous slurry of coal fines. Flotation aids are known in the art of mineral flotation. Some flotation aids include frothers and collectors. Frothers aid in fine air bubble formation. Frothers are typically surfactants that control and reduce bubble size and provide froth-building capacity. Collectors increase the natural hydrophobicity of the coal particle surface, increasing the separability of hydrophobic coal particles and hydrophilic ash-forming mineral content particles. Collectors are especially useful where the surface of the coal particles may be partially oxidized and have hydrophilic oxygen-containing "groups." Non-limiting examples of such oxygen-containing groups include hydroxyl, ketone, carboxylic acid, and ether groups. The flotation aid may be mixed with the aqueous slurry of coal fines. Any mixing process may be used that adequately disperses the flotation aid with the water and coal fines. The mixing process should enable collectors to adequately coat the coal fines.

In one non-limiting embodiment, the flotation aid is mixed with the coal fines under high energy mixing conditions. This is especially beneficial for collector flotation aids because high energy mixing helps to ensure uniform, complete coating of the coal particles with the collector to enhance the hydrophobicity of the coal particles and thereby enhance flotation of the coal particles.

The flotation aid is typically present in an amount less than about 0.03% by weight of the initial quantity of coal fines. Hard to float coal particles, which may include oxidized coal particles or coal particles that are too big or too small for a given operating condition, may require more than 0.03 wt. % flotation aid. In one non-limiting embodiment, the flotation aid comprises a collector. In another embodiment, the flotation aid comprises a frother. In yet another embodiment, the flotation aid comprises a combination of collector and frother. In still another non-limiting embodiment, the flotation aid is a nano-particle that selectively fixes to the carbon.

The disclosed flotation separation process is designed to function efficiently with a minimum amount of water. Recycling the water from which the solid particles are recovered for use again in the coal flotation cell not only reduces water requirement, but because the recycled water already contains a flotation aid, it reduces the amount of flotation aid, such as a frother, to be added to the aqueous slurry of coal fines. In one non-limiting embodiment, the invention includes the step of monitoring and maintaining the amount of frother in the water at an amount sufficient to promote desired bubble formation.

The coal flotation cell includes one or more bubble generators that generate bubbles within the coal flotation cell. A coal slurry injector is disposed above the one or more bubble generators to introduce the aqueous slurry of coal fines into the bubbles. The coal slurry injector preferably comprises a plurality of openings to permit the aqueous slurry of coal fines to be gradually and continuously introduced into the bubbles at a rate such that the coal particles are carried upward by the bubbles to form the coal-froth.

In one non-limiting embodiment, the bubble generator comprises a porous material. The porous material will typically have an average pore size. In one non-limiting embodiment, the average pore size may range from 3 μm to 30 μm. In more specific embodiments, the average pore size may be about 3 μm. In another embodiment, the average pore size may be about 6 μm. In some embodiments, the average pore size is between 5 and 7 μm. In another embodiment, the average pore size is less than 10 μm. In yet another embodiment, the average pore size may be about 15 μm. In another embodiment, the average pore size is less than 15 μm. In still other embodiments, the average pore size may be 30 μm. In some embodiments, the average pore size is less than 30 μm. Larger pore sizes tend to create larger bubbles. Larger bubbles are able to capture and float larger particles. Smaller pore sizes tend to generate more bubbles. The bubble generator is driven by a source of air. In one non-limiting embodiment, the air may have a high flow rate (cubic feet per minute or CFM) at relatively low pressure. In operation, it is typically desirable to maximize the air flow or bubble formation while minimizing the turbulence generated by the bubbles which may cause the bubbles to coalesce. Non-limiting examples of porous material that can be used in the bubble generators include porous ceramic and hydrophobic plastic materials.

In one non-limiting embodiment, the flotation separation process is operated in a manner to provide a flotation rate of coal-froth greater than 1.5 MTPH/m$^2$ on a dry basis. In the disclosed process for separating coal particles from ash-forming mineral content particles, one or more bubble generators generate bubbles within a quantity of water in the coal flotation cell. The bubble generators may comprise a porous material having an average pore size less than 30 μm. An aqueous slurry of coal fines comprising particles of coal and particles of ash-forming mineral content is introduced into the bubbles within the coal flotation cell in a manner that causes the bubbles to capture and float the coal particles and form a coal-froth. The coal fines in the aqueous slurry have a particle size less than about 500 μm. The bubbles are generated and the aqueous slurry is introduced into the bubbles such that the flotation rate of coal-froth is greater than 1.5 MTPH/m$^2$ on a dry basis.

In another non-limiting embodiment, the coal fines in the aqueous slurry have a particle size less than about 300 μm. In still another non-limiting embodiment, the coal fines in the aqueous slurry have a particle size less than about 150 μm. In yet another non-limiting embodiment, the coal fines in the aqueous slurry have a particle size less than about 100 μm. In a further non-limiting embodiment, the coal fines in the aqueous slurry have a particle size less than about 75 μm.

In another non-limiting embodiment, the aqueous slurry of coal fines contains greater than 25 wt. % coal fines. In yet another non-limiting embodiment, the aqueous slurry of coal fines contains greater than 35 wt. % coal fines. In still another non-limiting embodiment, the aqueous slurry of coal fines contains greater than 45 wt. % coal fines.

In another non-limiting embodiment, the bubble generators comprise a porous material having an average pore size less than 15 μm. In yet another non-limiting embodiment, the bubble generators comprise a porous material having an average pore size less than 10 μm. The Porous material comprises a material selected from ceramic and hydrophobic plastic materials.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
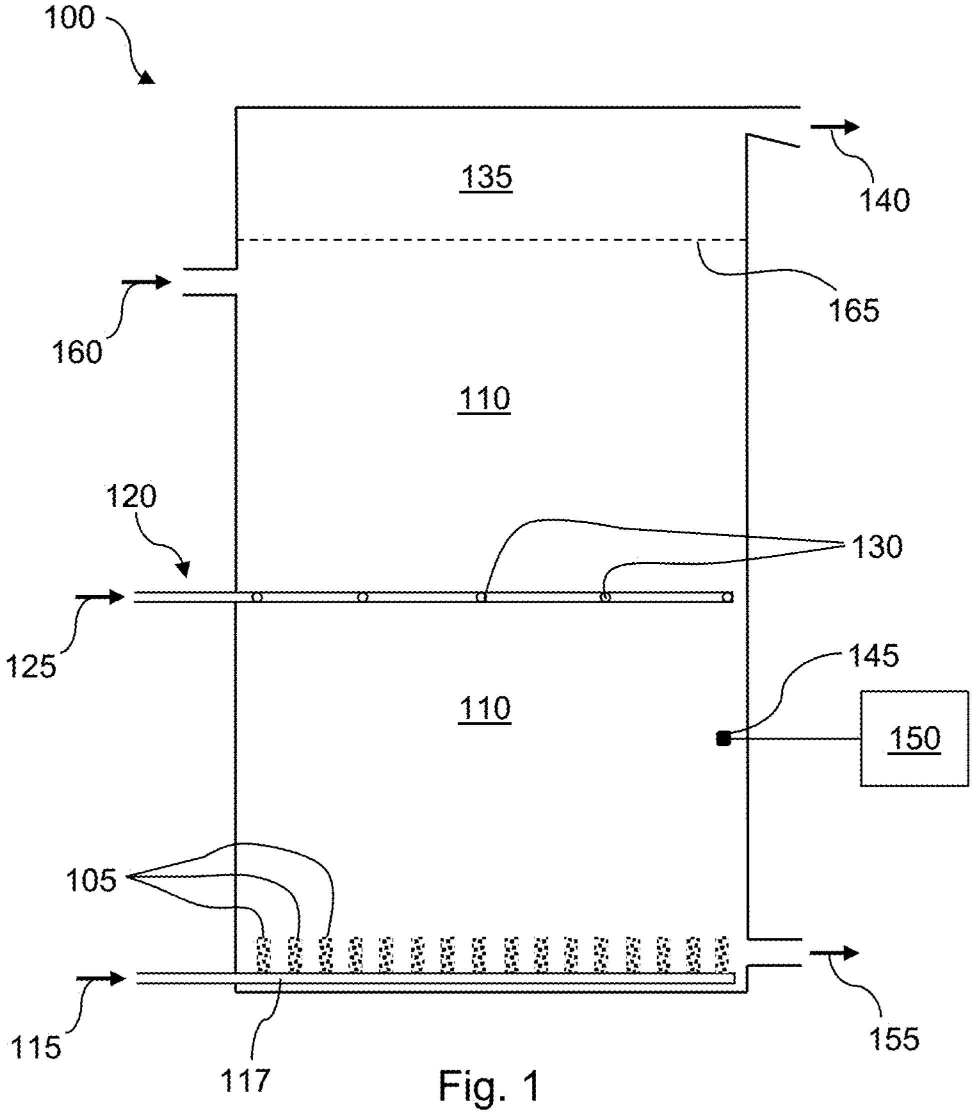
FIG. 1 shows a schematic representation of a coal flotation cell.

The present embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the invention is not intended to limit the scope of the invention, as claimed, but is merely representative of present embodiments of the invention.

One aspect of the disclosed invention relates to separating and recovering coal particles from ash-forming mineral content particles present in coal fines. In the disclosed process, a quantity of coal fines is obtained that comprises particles of coal, particles of ash-forming mineral content, and water. In one non-limiting embodiment, the coal fines have a particle size less than about 750 μm. In another embodiment, the coal fines have a particle size less than about 500 μm. In another embodiment, the coal fines have a particle size less than about 300 μm. In another embodiment, the coal fines have a particle size less than about 150 μm. In another embodiment, the coal fines have a particle size less than about 100 μm. In another embodiment, the coal fines have a particle size less than about 50 μm.

In the disclosed process, coal fines are prepared for separation of the coal particles from the ash-forming mineral content particles by mixing the quantity of coal fines with a quantity of water under high shear or high energy mixing conditions to form an aqueous slurry of coal fines. High shear or high energy mixing conditions serve to break up large particle agglomerates of coal fines into individual particles of coal and ash-forming mineral content and to suspend and disperse the particles throughout the slurry. Following high shear or high energy mixing conditions, the size of the coal fines may be reduced. Without being bound by theory, this high shear or high energy mixing process may serve to break up large particle agglomerates of coal particles and ash-forming mineral content particles into discrete, individual particles and suspend them evenly throughout the slurry.

An aqueous slurry of discrete, individual coal particles and ash forming mineral content particles serves to maximize combustible recovery and flotation efficiency. If a slurry is made without sufficient energy, agglomerates of coal particles and ash-forming mineral content particles remain in the coal fines. While some of these agglomerated coal and ash-forming mineral content particles may be dispersed into discrete, individual particles within the flotation cell, large agglomerates sink to the bottom of the cell because they are too large to float and other agglomerates remain in suspension or are floated out and collected as part of the coal-froth. The coal particles in the agglomerates that sink or remain in suspension are not collected in the coal-froth, and thus, lower the combustible recovery. The ash-forming mineral content particles in the agglomerates that float become included in the froth and reduce the flotation efficiency.

The aqueous slurry may optionally be passed through a crusher, microgrinder or mill, and then a sieve to ensure any large particles are removed from the aqueous slurry that could potentially clog downstream tubes and coal slurry injection ports.

There are distinct benefits to performing the disclosed flotation separation process with smaller size coal fines. For instance, breaking large particle agglomerates into smaller coal particles and ash-forming mineral content particles enables more entrapped ash-forming mineral content particles to be removed. In addition, smaller coal particles have more surface area for a given mass. More surface area increases the probability of the coal particles to be captured and floated by bubbles. In addition, more surface area increases the amount of coal that can be effectively processed to remove sulfur compounds from the coal.

An important advantage of the disclosed flotation process is the ability to use a high solids aqueous slurry of coal fines. This provides at least two distinct advantages. First, a high solids slurry means that less water is required to process the coal fines. Second, a high solids slurry makes it easier to maintain a volume balance of input slurry with the output coal-froth. In one embodiment, the aqueous slurry of coal fines may contain greater than 15 wt. % coal fines. In another embodiment, the aqueous slurry of coal fines may contain greater than 25 wt. % coal fines. In still another embodiment, the aqueous slurry of coal fines may contain greater than 35 wt. % coal fines. In yet another embodiment, the aqueous slurry of coal fines may contain about 40±15 wt. % coal fines.

In some embodiments, the coal fines in the aqueous slurry, after high shear or high energy mixing, have a particle size less than about 750 μm. In another embodiment, the coal fines in the aqueous slurry have a particle size less than 500 μm. In another embodiment, the coal fines in the aqueous slurry have a particle size less than 300 μm. In other embodiments, the coal fines in the aqueous slurry have a particle size less than about 150 μm. In yet other embodiments, the coal fines in the aqueous slurry have a particle size less than about 100 μm. In still other embodiments, the coal fines in the aqueous slurry have a particle size less than about 50 μm.

The preparing step may optionally comprise mixing the coal fines and water with a flotation aid. In one embodiment, the flotation aid is mixed with the aqueous slurry of coal fines in a surge tank prior to being introduced into the flotation cell. In one embodiment, the flotation aid comprises a collector. In another embodiment, the flotation aid comprises a frother. In yet another embodiment, the flotation aid comprises a combination of collector and frother. In cases it may be desirable to combine more than one frother and more than one collector. In still another non-limiting embodiment, the flotation aid is a nano-particle that selectively fixes to the carbon.

Flotation aids are known in the art of mineral flotation. For example, frothers aid in fine air bubble formation. Frothers are typically surfactants that control and reduce bubble size and to provide froth-building capacity. Non-limiting examples of common frothers include aliphatic alcohols and polyglycols, including polypropylene glycols and polypropylene glycol alkyl ethers having a range of alkyl groups and propylene oxide groups. Collectors increase the natural hydrophobicity of the coal particle surface, thereby increasing the separability of hydrophobic coal particles and hydrophilic ash-forming mineral content particles. Collectors are especially useful where the surface of the coal particles may be partially oxidized and have hydrophilic functional groups. Non-limiting examples of common collectors include liquid hydrocarbons such as kerosene, diesel, linseed oil, walnut oil, etc.

The flotation aid may be present in an amount less than about 0.3%, by weight, of the initial quantity of coal fines. In another embodiment, the flotation aid may be present in an amount less than about 0.1% by weight of the initial quantity of coal fines. In another embodiment, the flotation aid may be present in an amount less than about 0.01% by weight of the initial quantity of coal fines.

In the disclosed process, coal particles are separated from ash-forming mineral content particles using flotation separation. Thus, the aqueous slurry of coal fines is introduced into a coal flotation cell at multiple points and at a rate and concentration to accommodate effective capture by the bubbles.

Bubbles are generated in a quantity of water disposed in the coal flotation cell. The bubbles have a bubble size selected to capture and float the coal particles of a particular size thereby separating coal particles from ash-forming mineral content particles by flotation separation. The bubble quantity is preferably maximized to the water volume without causing bubble coalescence. Larger bubbles are required to capture and float larger coal particles. Smaller bubbles are required to capture and float smaller coal particles. Without being bound by theory, it is believed the smaller bubble size provides increased surface area to contact with the coal particles. This is believed to improve the particle flotation rate for smaller particles.

FIG. 1 shows a non-limiting schematic representation of a coal flotation cell 100. The coal flotation cell includes one or more bubble generators 105 that generate bubbles in a zone 110 above the bubble generators 105 within the coal flotation cell 100. In one non-limiting embodiment, the bubble generators 105 comprise a porous material. The porous material will have an average pore size. In one non-limiting embodiment, the average pore size may range from 3 μm to 30 μm. In more specific embodiments, the average pore size may be about 3 μm. In another embodiment, the average pore size may be about 6 μm. In yet another embodiment, the average pore size may be about 15 μm. In still other embodiments, the average pore size may be 30 μm. In some embodiments, the average pore size is between 5 and 7 μm. In another embodiment, the average pore size is less than 10 μm. In another embodiment, the average pore size is less than 15 μm. In some embodiments, the average pore size is less than 30 μm. Larger pore sizes tend to create larger bubbles. Larger bubbles are able to float larger particles. Smaller pore sizes tend to generate more bubbles. Non-limiting examples of porous materials that may be used in the bubble generators include porous ceramic and hydrophobic plastic materials.

In one non-limiting embodiment, the bubble generators are fabricated of a microporous or ceramic material with about 45% porosity. The bubble generators can take any suitable form as long as air can be forced through them. One presently preferred form is a cylinder 1 inch (25.4 mm) outside diameter by 3 inches (76.2 mm) tall. The sidewalls of the cylinder are 3/16 inch (4.8 mm) thick. One end of the cylinder is capped. The other end is plumbed into a common manifold 117.

The bubble generators are driven by a source of air 115 through a manifold 117. In one non-limiting embodiment, the air source 115 may have a high flow rate at relatively low pressure. In one embodiment, the pressure is less than 10 psi (pounds per square inch) and preferably between 6 and 7 psi. In one embedment, the flow rate is between 200 and 500 CFM (cubic feet per minute). In operation, it is typically desirable to maximize the air flow or bubble formation while minimizing the turbulence generated by the bubbles. Turbulence of the water-bubble mixture can influence coal flotation efficiency. Without being bound by theory, it is believed high turbulence causes the bubbles to coalesce and form larger size bubbles. Larger size bubbles have smaller relative surface area with which to contact and float coal particles. It is presently believed larger size bubbles decrease coal flotation efficiency. It is presently believed that bubble formation should produce minimal bubble coalescence, even in turbulent zones, until after particle capture. Thereafter, bubble flow is preferably laminar to avoid particle loss from the bubble.

Four different flotation cells following the design described above were used: a lab-scale flotation cell 17.5 inch (0.444 m) in diameter by 6 foot (1.83 m) tall with 24 bubble generators having a pore size of 6 μm, a lab-scale flotation cell 17.5 inch (0.444 m) in diameter by 20 foot (6.1 m) tall with 24 bubble generators having a pore size of 6 μm, a pilot-scale flotation cell 4 foot (1.22 m) in diameter by 10 foot (3.05 m) tall with 40 bubble generators having a pore size of 6 μm, and a production scale flotation cell 8.5 foot (2.59 m) in diameter by 14 foot (4.27 m) tall with 200 bubble generators having a pore size of 6 μm. Multiple coal fine flotations were performed in the different flotation cells.

The bubble generator pore size was varied in the two 17.5 inch (0.444 m) diameter floatation cells described above. Some flotation separation tests were performed using 24 bubble generators having a pore size of 3 μm. Some flotation separation tests were performed using 6 bubble generators having a pore size of 15 μm. Some flotation separation tests were performed using 4 bubble generators having a pore size of 30 μm.

A coal slurry injector 120 is disposed above the one or more bubble generators 105 to introduce the aqueous slurry of coal fines 125 into the bubbles within the bubble zone 110. The coal slurry injector 120 preferably comprises a plurality of openings 130 to permit the aqueous slurry of coal fines 125 to be gradually and continuously introduced into the bubbles at a rate such that the coal particles are carried upward by the bubbles to form the coal-froth 135. In operation, the bubble zone 110 extends upward from the bubble generators 105 to the coal-froth 135. The coal slurry injector openings 130 are preferably spaced to evenly distribute the aqueous slurry of coal fines 125 into the bubble zone 110.

When the coal slurry is added to the flotation cell, a coal-froth 135 builds and forms in an upper region of the coal flotation cell 100 as the hydrophobic coal floats on the surface of the bubbles to the top of the cell 100. Small amounts of ash-forming mineral content particles may also be present in the coal-froth 135. This may result from a small amount of ash forming mineral content particles agglomerated with floated coal particles. In addition, water from the pulp is also included in the froth. The water from the pulp contains suspended coal particles and ash-forming mineral content particles. Thus, the coal-froth includes solid particles comprising coal particles, ash-forming mineral content particles, and water. In one embodiment, the coal-froth comprises at least 15 wt. % solid particles. In another embodiment, the coal-froth comprises at least 20 wt. % solid particles. In yet another embodiment, the coal-froth comprises at least 30 wt. % solid particles. In still another embodiment, the coal-froth comprises at least 40 wt. % solid particles. In a further embodiment, the coal-froth comprises at least 45 wt. % solid particles.

In one non-limiting embodiment, the collected solid particles in the coal-froth contain less than 8%, by weight, ash-forming mineral content particles. In another embodiment, the collected solid particles in the coal-froth contain less than 5%, by weight, ash-forming mineral content particles. In yet another embodiment, the collected solid particles in the coal-froth contain less than 3%, by weight, ash-forming mineral content particles. In one non-limiting embodiment, the coal-froth contains less than 50 wt. % of the ash-forming mineral content of the aqueous slurry of coal fines. In another non-limiting embodiment, the coal-froth contains less than 40 wt. % of the ash-forming mineral content of the aqueous slurry. In a non-limiting embodiment, the coal-froth contains less than 30 wt. % of the ash-forming mineral content of the aqueous slurry. In another embodiment, the coal-froth contains less than 20 wt. % of the ash-forming mineral content of the aqueous slurry. In yet another embodiment, the coal-froth contains less than 10 wt. % of the ash-forming mineral content of the aqueous slurry.

The coal-froth 135 is removed from the cell via coal-froth exit port 140. The coal-froth may be collected in a suitable surge tank until it is further processed. Such further processing includes, without limitation, dewatering to form a filter cake, pelletization of the filter cake to form coal pellets, and further processing of the coal pellets to render them moisture resistant, dust resistant, crush resistant, etc.

The disclosed flotation separation process is preferably operated such that the volume of aqueous slurry 125 input to the flotation cell balances the volume of coal-froth output from the flotation cell via coal-froth exit port 140. In this manner, the flotation cell 100 can be operated under approximate steady-state conditions. In contrast, typical commercially available coal flotation systems require a continuous liquid drainage of the flotation cell to maintain a steady water level because the amount of liquid added to the cell exceeds its capacity.

In one disclosed embodiment, the flotation separation process includes the step of stopping the introduction of the aqueous slurry 125 of coal fines into the coal flotation cell but continuing to generate bubbles and coal-froth for a period of time. This step of continuing to generate bubbles and coal-froth is sometimes referred to as a “clean-up” period. The length of the clean-up period may vary depending upon the quantity of coal particles remaining in the flotation cell that need to be floated after the introduction of the aqueous slurry of coal fines into the coal flotation cell is stopped. In one non-limiting embodiment, the clean-up period ranges between 15 seconds and 10 minutes.

In one disclosed embodiment, the introduction of the aqueous slurry 125 of coal fines into the coal flotation cell is stopped after a predetermined time period or after a predetermined quantity of aqueous slurry of coal fines is introduced into the coal flotation cell.

In one disclosed embodiment, the flotation separation process includes the step of monitoring the content of solid particles in the quantity of water within the coal flotation cell 100. The solid particles include ash-forming mineral content particles and coal particles. One or more sensors 145 may be used for this purpose. The sensors 145 may also be used to monitor other process operating conditions. The sensors 145 may be coupled to a suitable process controller 150 that is operated to control input flow rates, input and output values, pumps, blowers, etc. When the content of solid particles in the quantity of water in the coal flotation cell 100 exceeds a predetermined weight percentage, then the flotation separation process is modified by stopping the introduction of the aqueous slurry 125 of coal fines into the coal flotation cell and continuing to generate bubbles and coal-froth for a clean-up period of time.

After the clean-up period, the quantity of water in the coal flotation cell is drained via flotation cell drain 155. This drained water may be further processed to separate and recover the solid particles from the drained water. The solid particles recovered from the drained water are predominantly ash-forming mineral content particles. The solid particles recovered from the drained water may also include a small measurable amount of coal particles.

In one disclosed embodiment, the predetermined weight percentage of solid particles in the quantity of water is 7 wt. %. In another disclosed embodiment, the predetermined weight percentage of solid particles in the quantity of water is 5 wt. %. In yet another disclosed embodiment, the predetermined weight percentage of solid particles in the quantity of water is 3 wt. %. In still another disclosed embodiment, the predetermined weight percentage of solid particles in the quantity of water is between 4 wt. % and 7 wt. %. In another disclosed embodiment, the predetermined weight percentage of solid particles in the quantity of water is between 5 wt. % and 6 wt. %.

The disclosed flotation separation process may also include the step of recycling the water from which the solid particles are recovered for use again in the coal flotation cell. Recycled water, fresh water, or a combination of recycled and fresh water may be introduced into the flotation cell 100 via water inlet 160 to a water level shown by dashed line 165.

The disclosed process is designed to function efficiently with a minimum amount of water. Recycling the water from which the solid particles are recovered for use again in the coal flotation cell not only reduces water requirements, but because the recycled water already contains a flotation aid, it reduces the amount of flotation aid, such as a frother, to be added to the aqueous slurry of coal fines.

In one non-limiting embodiment, the invention includes the step of monitoring and maintaining the amount of frother in the water at an amount sufficient to promote desired bubble formation. One method of measuring the amount of frother in the water is by measuring the gas holdup in the water. Gas holdup equals the volume of the bubbles divided by the total volume, i.e. bubbles plus water.

As stated previously, combustible recovery is a metric used to characterize flotation cell performance. Combustible recovery is defined as $C_{out}/C_{in}$, where $C_{out}$ represents the total coal particle (carbon) content in the coal-froth output (measured on a dry basis) and $C_{in}$ represents the total coal particle (carbon) content in the aqueous slurry of coal fines input (measured on a dry basis). In some non-limiting embodiments of the flotation separation process the combustible recovery is greater than 90%. In other embodiments, the combustible recovery is greater than 93%. In yet other embodiments, the combustible recovery is greater than 95%. In still further embodiments, the combustible recovery is 97% or more.

The following non-limiting examples are given to illustrate several embodiments relating to the disclosed coal flotation separation process and related apparatus. It is to be understood that these examples are neither comprehensive nor exhaustive of the many types of embodiments which can be practiced in accordance with the presently disclosed invention.

Example 1

Measuring moisture content and ash-forming mineral content of a coal sample.

The moisture content and ash-forming mineral content of any coal sample, in this case the slurry, were obtained by following the procedure outlined in ASTM Standard D7582—Standard Test Methods for Proximate Analysis of Coal and Coke by Macro Thermogravimetric Analysis and ASTM Standard D3173-11—Method for Moisture in the Analysis Sample of Coal and Coke.

For moisture, the mass of the slurry was measured. The slurry was then dried in an oven at 110° C. under flowing, dry air for one to two hours. The mass of the sample was obtained after complete drying. The mass remaining after drying is the solid content of the sample, and the mass lost is the moisture content of the material. Wt. % solid and wt. % moisture are calculated for the sample. Wt. % solids content=mass wet sample/mass dry sample. Wt. % moisture=100%−wt. % solids sample.

For quantifying ash-forming mineral content of the sample, the mass of a dry slurry sample was measured. The sample was then heated in a muffle furnace under flowing dry air, ramping from room temperature to 750° C. over the course of two hours. The temperature was held at 750° C. for two hours, whereupon the sample was removed from the muffle furnace. In an alternative test, the coal sample was heated at 950° C. for four hours under flowing dry air. The sample was cooled in a desiccator to room temperature. During the heating process, the coal particles were burned off and only oxidized mineral content remained. Coal or carbon content is the combustible carbon matrix that is in a sample. The mass of the remaining sample was obtained. From the mass of the remaining oxidized mineral content and the starting mass, the wt. % ash-forming mineral content was calculated. Wt. % ash=dry ash mass after furnace/dry sample mass before furnace. Wt. % coal or carbon content=100%−wt. % ash content.

These procedures can be followed to obtain moisture and ash-forming mineral content on any sample at any stage of the process (e.g. as-received coal fines, aqueous slurry of coal fines, coal-froth, filter cake, dry coal pellet product, etc.).

Example 2

High Shear or High Energy Slurry Preparation and Vibratory Screen Deslime Unit.

Regular un-milled aqueous slurry is made from coal fines by introducing the coal fines into a paddle mixer. The paddle homogenizes the sample and the moisture content is obtained. Water is added to the coal fines to reduce the solids content to between 45 wt. % and 50 wt. % solids. While the paddle mixers are still turning, high energy mixers are also turned on for up to two minutes. The high shear mixers break apart clumps and agglomerations of coal and ash-forming mineral content particles creating a slurry of discrete coal and ash-forming mineral content particles.

High energy mixing was initially developed using lab-scale equipment by testing shear mixing. First, an aqueous slurry of coal fines was made using a 0.13 $m^3$ Hobart paddle mixer with a 0.42 m diameter paddle. Tip speed is a measure of the velocity of the tip of a blending element and is used to characterize the mixing action of a turning element. The Hobart paddle mixer had a tip speed of 1.5 m/s. When the slurry was poured over a sieve with 500 μm openings, agglomerates of coal particles and ash-forming were retained on the sieve. Higher shear mixing was then attempted at a lab-scale using a common household blender with a maximum tip speed of about 130 m/s. It was found that slurries produced with the blender set at a tip speed of 130 m/s could be poured over a sieve with 500 μm openings without agglomerates of coal particles and ash-forming remaining behind on the sieve. Successful shear mixing produces an impact force sufficient to break up agglomerates of smaller particles of coal fines into individual particles of coal and ash-forming mineral content. As used herein, high shear mixing produces an impact force sufficient to create discrete coal particles and ash-forming mineral content particles.

High shear mixing was further tested at a pilot-scale using larger volume mixers. A 1.7 $m^3$ mixer with a 1.06 m diameter paddle and two 10 cm diameter choppers was tested. The paddle mixer operated at a maximum tip speed of 2.0 m/s. The chopper mixers operated at a maximum tip speed of 19 m/s. In the pilot scale tests, 0.794 metric tons (MT) of incoming coal fines were fed into a paddle mixer with a metering conveyer belt. The moisture content was measured to be 24.5 wt. % moisture. The coal fines contained approximately 25 wt. % ash-forming mineral content particles on a dry basis. It was calculated that 0.405 MT of water needed to be added to the mixer to make a 50 wt. % moisture slurry.

Using the paddle mixers alone at a maximum tip speed of 2.0 m/s for 2 minutes could not fully suspend all the coal and ash-forming mineral content particles into a slurry of discrete or individual particles. A significant amount of agglomerates comprising coal particles and ash-forming mineral content particles were collected on the 1.4 mm and 0.7 mm screens of a double deck vibratory screen deslime unit.

In the same pilot-scale mixer, the two 10 cm diameter chopper mixers were turned on at their maximum tip speed of 19 m/s in conjunction with the paddle mixer at their maximum tip speed for two minutes. The paddle mixer served to bring the coal fine agglomerate particles in the slurry to the chopper mixers, whereupon the chopper mixers broke up the coal fines agglomerates. The slurry made with the high speed choppers and paddle mixer as just described was fed onto the top screen (1.4 mm) of the double deck vibratory screen deslime unit. No material was retained on top because there were no particles larger than 1.4 mm in the coal fines used to make the slurry. The aqueous slurry easily flowed through the screen. The aqueous slurry also passed through the 0.7 mm screen without build-up with the exception that a certain amount of discrete coal and ash-forming mineral content particles from the slurry were retained on the screen because they were larger than 0.7 mm. These 0.7 mm retains were discharged from the screen as per the normal operation of the unit. An aqueous slurry containing discrete coal particles and ash-forming mineral content particles less than 0.7 mm in size was produced during this two minute mixing time.

A minimum tip speed needed to produce a slurry of individual particles of coal particles and ash-forming mineral content particles was investigated in a smaller pilot-scale chopper mixer. This mixer has a 0.23 $m^3$ hopper mounted on a pipe. The pipe is 0.17 m inside diameter and is 0.36 m long. Inside the pipe is a 0.15 m diameter chopper mixer with one chopper blade. The chopper mixer has a maximum tip speed of 28.5 m/s. The chopper mixer was turned on at a chosen tip speed. Water and coal fines were added to the chopper mixer to fill the pipe and just begin to fill the hopper. Water and coal fines were added in an amount to produce a 50 wt. % solid slurry. The coal fines contained approximately 25 wt. % ash-forming mineral content on a dry basis. After a two minute mixing time, the slurry was discharged over a 300 micron screen of a vibratory deslime unit. The retains on the screen were then analyzed for agglomerates of coal particles and ash-forming mineral content particles. It was found that a tip speed of at least 11.5 m/s produced a slurry with discrete carbon particles and ash-forming mineral content particles such that no agglomerate particles were found in the retains on the sieve with 0.3 mm openings.

The minimum tip speed of 11.5 m/s to produce discrete particles was further tested using coal fines that contained 70 wt. % ash-forming mineral content particles on a dry basis. The same smaller pilot-scale chopper mixer described above was used. The same procedure as described above to produce a 50 wt. % solids slurry was also followed. After the two minute mixing time, the slurry was discharged over the 0.3 mm vibratory deslime screen. Analysis of the retains on the 0.3 mm sieve showed no agglomerates of coal particles and ash-forming mineral content particles.

Different size and speed choppers may be used to provide high shear mixing. For instance, chopper blades ranging from 3-6 inches may be operated at a speed ranging from 1800 to 3600 rpm. The size and speed of suitable choppers may be scaled according to performance requirements. Successful high shear mixing produces an impact force sufficient to break up agglomerates of smaller particles of coal fines into individual particles of coal and ash-forming mineral content.

A slurry with 15 wt. % solids using coal fines that contained 25 wt. % ash-forming mineral content particles on a dry basis was made in the smaller pilot-scale chopper mixer at tip speeds of 11.5 m/s. Analysis of the retains on the 0.3 mm sieve showed no agglomerates of coal particles and ash-forming mineral content particles. This slurry was used for flotation separation in various flotation columns: a lab-scale flotation cell 17.5 inches (0.444 m) in diameter by 6 feet (1.83 m) tall, a lab-scale flotation cell 17.5 inches (0.444 m) in diameter by 20 feet (6.1 m), and a pilot-scale flotation cell 4 feet (1.22 m) in diameter by 10 feet (3.05 m).

A slurry with 30 wt. % solids using coal fines that consisted of 25 wt. % ash-forming mineral content particles on a dry basis was made in the smaller pilot-scale chopper mixer at tip speeds of 11.5 m/s. Analysis of the retains on the 0.3 mm sieve showed no agglomerates of coal particles and ash-forming mineral content particles. This slurry was used for flotation separation in various flotation columns: a lab-scale flotation cell 17.5 inches (0.444 m) in diameter by 6 feet (1.83 m) tall, a lab-scale flotation cell 17.5 inches (0.444 m) in diameter by 20 feet (6.1 m), and a pilot-scale flotation cell 4 feet (1.22 m) in diameter by 10 feet (3.05 m).

From the foregoing, an aqueous slurry of discrete particles can be produced using high shear mixing with a tip speed of at least 11.5 m/s from coal fines with a range of ash-forming mineral content particles on a dry basis and a range of solid content amounts.

High energy mixing to create an aqueous slurry of coal fines containing discrete particles of coal and ash-forming mineral content was also demonstrated in the lab via a combination of a paddle mixer with a tip speed of 1.5 m/s and ultrasonication with a at 40 kHz in a mixing vessel of 0.004 $m^3$. The aqueous slurry of coal fines contained 50 wt. % solids and had 25 wt. % ash-forming mineral content on a dry basis. The mixing time was 2 minutes. The slurry could be poured over a 300 μm vibratory sieve with no agglomerates found in the material retained on the sieve. Mixing with the paddle mixer alone produced a slurry containing agglomerates of coal particles and ash-forming mineral content particles.

A benefit of the slurry produced via high energy mixing and containing discrete particles is that the slurry easily passes through sieves, especially when vibration is applied to the sieves, leaving behind retains on the sieve that are larger than the openings of the screen of said sieve. Particles smaller than the sieve openings flow through the sieve like water because they are discrete and suspended in the water passing through the sieve. The maximum size of particles in the slurry can be selected by the smallest sieve used in a vibratory deslime unit. Slurries have been produced where 0.75 mm sieve was the smallest sieve used in the vibratory deslime unit. Slurries have been produced where 0.5 mm sieve was the smallest sieve used in the vibratory deslime unit. Slurries have been produced where 0.3 mm sieve was the smallest sieve used in the vibratory deslime unit. Slurries have been produced where 0.025 mm sieve was the smallest sieve used in the vibratory deslime unit. The retains on the sieve(s) of the vibratory deslime unit can be sent to a milling circuit for size reduction and then fed into the flotation circuit or they can be removed from the process and sold as is, depending on the ash content of the retains.

The high energy mixing step enables highly efficient, fast screening of the slurry because it creates an aqueous slurry of discrete particles of coal and ash-forming mineral content. The discrete particles in slurry suspension allow the use of a smaller sized (e.g. area) deslime screen unit for the volume of slurry being processed compared to deslime screen units common to the field. As a result, a high solids content slurry can be processed, reducing the use of excess water.

Further, because of the discrete nature of the solid particles in the slurry, it is not necessary to use wash water to ensure that all the small particles in the slurry pass through a larger sieve opening, which is a common practice in the industry. The use of wash water over a deslime screen requires even more water in the process, diluting the slurry being produced. Without the use of high shear mixing, it would be difficult or impossible to produce a slurry that passes the desired sieve size (e.g. less than 500 μm) with a high solid concentration (e.g. greater 25 wt. % and up to 50 wt. % or more solids).

Example 3

Milling Circuit to Prepare a Milled Slurry.

The retained particles on the 0.7 mm and 1.4 mm screens of the vibratory screen deslime unit were processed through a wet mill to reduce their size to 0.3 mm or below. Particles with an average particle size less than 0.15 mm have been produced. In some embodiments, the average particle size of the milled slurry was less than 0.04 mm. In other embodiments, the average particle size of the milled slurry was 16.5 μm. The milled slurry preferably has no particles greater than about 200 μm. A target average particle size can be produced by varying the exit dimensions of the mill, residence time in the mill, media size in the mill, and media volume in the mill.

Ash-forming mineral content particles are entrapped in coal particles. The entrapped ash-forming mineral content particles have an average particle size on the range of less than 0.01 mm. In one instance the average particle size of the ash-forming mineral content particles was measured to be of 0.004 mm. The average particle size of the coal particles coming out of the milling circuit was chosen to be small enough such that entrapped ash-forming mineral content particles was minimized. In theory, milling the coal particles to the same size as the entrapped ash-forming mineral content particles would minimize entrapment. However, the smaller the target coal particle size, the longer the required milling time.

It was found that milling to average particles sizes 10× greater and 100× greater than the average ash-forming mineral content particle sizes resulted in minimized entrapped ash-forming mineral content of ranging from 2 to 4 wt. %, depending upon the coal site and particle size milled to. Resultantly, target coal particle size after the milling circuit is 1× to 10× and on up to 100× greater than the entrapped ash-forming mineral content particles size. In the case of the entrapped ash-forming mineral content particles having an average size of 0.004 mm, the coal particles would have average particle sizes 4 microns, 40 microns, and on up to 500 microns when exiting the wet mill. There are two reasons for the setting a particle size upper limit of 500 microns after wet milling. First, for some coals, the entrapped ash-forming mineral content starts to reach levels greater than 4 to 5 wt. % as average coal particle size exceeds 500 microns. Second, coal particles much greater than 500 microns do not float well in the flotation system described herein. Thus, the average coal particle size is preferably less than 500 microns to improve coal particle flotation and to reduce the ash-forming mineral content.

Example 4

Flotation.

A commercial size flotation cell was configured generally as shown in FIG. 1. It had a 8.5 foot (2.59 m) diameter by 14 foot (4.27 m) tall tank made from mold-cast high-density polyethylene (HDPE). The flotation cell contained multiple bubble generators (105) in the bottom. Each bubble generator comprises a cylinder made of microporous ceramic or hydrophobic plastic. The cylinders are 3 inches (76.2 mm) tall and have a 1 (25.4 mm) inch outside diameter with a wall thickness of 3/16 inch (4.8 mm). One end of the cylinder is capped. The other end of the cylinder is plumbed into a common manifold located at the bottom of the flotation cell. The number of discrete bubble generators plumed into the manifold will vary depending upon the diameter of the flotation cell and the pore size of the generators. For the commercial size flotation cell described herein, there may be between 100 to 200 bubble generators connected to the manifold. Non-limiting examples of average pore sizes are 3 μm, 6 μm, 15 μm, and 30 μm. As the pore size of the bubble generators is increased, the average particle size of the floated coal particles increases. Bubble generators with different pore sizes can be mixed and matched to the manifold to tune the average particle size of the coal particles floating in the coal-froth.

Air is forced into the manifold by a blower. The air passes through the pores of all the bubble generators plumbed into the manifold and produces bubbles in the water at the base of the flotation cell. A blower forces air into the manifold and through the bubble generators at a pressure and volume flow rate suitable for the size of the flotation cell and the number and size of bubble generators used. In one non-limiting example, the blower operates at a pressure less than 10 psi (pounds per square inch), preferably between 6 and 7 psi, and at a volume flow rate of between 200 to 500 CFM (cubic feet per minute).

The flotation cell is filled with clarified water up to a water level below the top of the cell, as indicated by the dotted line 165. The aqueous slurry of coal fines is pumped through manifold 120, entering into the cell through ports labeled 130. As slurry is pumped into the flotation cell, bubbles carry coal particles to the water level line 165. At the water line, small bubbles at the water surface coalesce into larger bubbles forming a coal-froth. Coal particles stay adhered to the coalesced bubbles in the coal-froth. The upward force of arriving bubbles from below pushes the coal-froth up into region 135 and out of the coal-froth exit port 140.

A commercial size 8.5 foot (2.59 m) diameter by 14 foot (4.26 m) tall flotation cell has been operated in a batch mode as described herein. First, a blower was turned on at 300 CFM to blow air through the manifold and microporous ceramic bubble generators in the bottom of the cell. Air always blows through the bubble generators to prevent any potential clogging of the pores by suspended particles in the water. The flotation cell was filled to a depth of about 13 feet (3.96 m) of water. An aqueous slurry of coal fines, containing about 70 wt. % coal particles and 30 wt. % ash-forming mineral content particles on a dry basis, was pumped into the cell at 170 liters per minute for 44 minutes, after which the slurry feed was turned off. Coal particles that were still suspended in the bubble region floated out of the cell during a 10 minute clean-up time. Coal-froth spilled over the top of the flotation cell during the last 42 minutes of the slurry injection and all but the last minute of the clean-up time. After the 10 minute cleanup time, 12 feet of the 13 feet of water depth in the flotation cell were drained out in 1.8 minutes and sent to a thickener. The flotation cell was then filled back up to the 13 foot water line in 1.8 minutes. The batch-like process was started once again as slurry was pumped into the flotation cell at 170 liters per minute. The batch-like process has a 1-hour cycle time.

During the operation cycle described above, 5.4 metric tons of coal-froth were collected at 50.7 wt. % solids, which was 2.7 metric tons of coal-froth on a dry basis. The coal-froth was 5.1 wt. % ash-forming mineral content particles on a dry basis. Additionally, 21.5 metric tons of tailings were drained out as underflow at 5.7 wt. % solids, which was 1.22 metric tons of tailings on a dry basis. The tailings were 85.7 wt. % ash-forming mineral content particles. The combustible recovery for the results of batch-like cycle explained and reported above was over 93%.

Based on the representative results reported above for operating a 8.5 foot (2.59 m) diameter by 14 foot (4.26 m) tall commercial sized flotation cell with a 50 wt. % solid slurry feed at 30 wt. % ash-forming mineral content particles on a dry basis, 36 to 37 flotation cells will be needed to produce 100 MTPH (metric tons per hour) pelletized coal product. Each 100 MT will consist of 93.1 MT of coal particles, 4.9 MT of ash-forming mineral content particles, and 2.0 MT of water. The underflow for each 100 MT will be 44 MT of dry solids at 85 wt. % ash-forming mineral content particles. The combustible recovery for each 100 MT will be greater than 90%.

Example 5

Comparison of Water Usage

The disclosed systems and methods for the flotation separation of fine coal particles from ash-forming mineral content particles uses significantly less water than competing coal flotation processes. As an example, the data in Table 1 below compares water usage according to the disclosed systems and methods for the flotation separation of fine coal particles to that of a coal processing facility using commercially available coal flotation columns. Both facilities would produce 100 MTPH dry product.

TABLE 1

| Input | MTPH Water | Output | MTPH Water |
|---|---|---|---|
| Water Usage for Commercial Flotation Separation Columns scaled to 100 MTPH dry product out | | | |
| Aqueous Slurry | 2668.5 | Coal-Froth | 733.1 |
| Wash Water | 865.7 | Tails (ash) | 2801.1 |
| Total Water | 3534.2 | Total Water | 3534.2 |
| Water Usage for Disclosed Flotation Separation Cell scaled to 100 MTPH dry product out | | | |
| Aqueous Slurry | 101 | Coal-Froth | 120 |
| Milling Circuit | 11 | Tails (ash) | 824 |
| Into Flotation Cell | 795 | Total Water | 944 |
| In Incoming Coal | 37 | | |
| Total Water | 944 | | |

The facility using commercially available flotation columns would use about 3.75 times more water than the presently disclosed system. The water savings is primarily a result of differences in the aqueous slurry input feed and in the coal-froth output. The commercial flotation feed is about 5 wt. % solids. In contrast, the disclosed system is typically about 50 wt. % solids. The commercial flotation coal-froth output is about 12 wt. % solids, the disclosed system is typically about 45% solids. In addition, the commercial flotation tails or underflow is about 1 wt. % solids, whereas the disclosed system is typically about 5 to 6 wt. % solids.

The reduction in water usage translates to substantial savings in capital costs (smaller pumps, smaller pipes, smaller sieve deslime unit, smaller surge capacity, smaller dewatering equipment, etc.) and operational costs (less electricity to run smaller equipment, less money used in dewatering the products, less water costs, etc.).

Example 6

General Operation of Laboratory Scale Flotation Cell

A 17.5 inch (0.444 m) diameter by 6 foot (1.83 m) tall laboratory scale flotation cell was used. The bottom of the flotation cell had a common air manifold into which 24 bubble generators were plumbed. The manifold was 24 inches (0.61 m) by 24 inches (0.61 m) and 4 inches (0.10 m) tall. For some experiments, the 24 bubble ceramic bubble generators had 6 μm pores and an average porosity of 45%. For other experiments, the ceramic bubble generators had an average pore size of 3 μm, 15 μm, and 30 μm. A 2.5 inch (0.063 m) air feed pipe connects the manifold to a blower. The blower supplied air to the manifold, and thus to all of the bubble generators equally, between 4 and 7 psi in a range of 10 to 40 cubic feet per minute (CFM) of air.

The blower was turned on at the desired CFM. Water was added to the flotation cell to a depth of 4 feet (1.22 m). 4.2 grams of frother was added to the cell. The frother was completely mixed after 2 minutes. After addition of the frother, the bubbles stabilized to the characteristic size for the bubble generators. Water was added to increase the pulp region to a depth of 5 feet level in the flotation cell. The white foam indicates the boundary where the coal-froth will form when coal slurry is introduced into the flotation cell. The pulp region is filled up to the 5 foot (1.52 m) line of the flotation cell leaving a froth height of about 1 foot (0.305 m).

An aqueous slurry of coal fines was pumped into the cell with a pump at about 5 kg/min for 30 minutes. Coal-froth was collected as it overflowed the column via a gutter system. After 30 minutes, the slurry feed was turned off. The bubbles continued to run. Any excess carbon in the cell was allowed to continue to froth over for 10 minutes. At the end of a flotation cycle as described herein, the water-bubble region was brown in color, characteristic of the ash-forming mineral content that have remained behind in the pulp during the flotation separation process. The pulp was then drained into two 55-gallon drums. Sediment that did not float and was not carried away with the drained tailings was left on the bottom plate of the flotation cell. These sediments were collected.

Solid wt. %, ash wt. %, and total mass (water+solids) were measured for the aqueous slurry added, the coal-froth collected, the tails drained, and the sediment. The amount of carbon in each material was calculated from the Solid wt. %, ash wt. %, and total mass. From this data, combustible recover was calculated. Flotation rate at which dry coal or carbon product exits a flotation cell was calculated and was reported in metric tons per hour per square meter of flotation column surface area (MTPH/$m^2$). Flotation efficiency was also calculated.

Experimental results for the Laboratory tests described herein are reported in Tables 2A-2G below. As labeled in the tables, flotations were done with slurries passing a 0.75 mm sieve, a 0.5 mm sieve, and a 0.3 mm sieve. An additional slurry that was milled in a wet ball mill was also used for flotation separation of coal fines. The flotation cell input parameters are repeated in each table so as to be able to see how different inputs influence flotation results (outputs).

Most of the flotation data reported in Tables 2A-2G was done using on milled slurry passed through a 0.75 mm sieve that was then fed into the flotation cell. Some coal particles were retained and removed from the slurry on the 0.75 mm sieve. The average particle size in the un-milled slurry was about 20 microns, but the slurry had larger particles in it, as large as 300 microns (Table 2A) in one measurement. Sediment particles for flotations using slurries that passed the 0.75 mm sieve reached sizes as large as 1.2 mm (Table 2F), indicating that particles this size existed in the slurry but at such a low concentration they were not represented in the sample used for particles size analysis of the slurry. The 1.2 mm particles in the sediment, which must have also been in the slurry can be explained by the fact that a 0.75 mm sieve will have some holes larger than 0.75 mm and the particles in the slurry may be at times oblong or needle-like in shape allowing them to pass the sieve but show a larger size in particles size analysis.

Two flotations reported in Tables 2A-2G were done using a milled slurry as the feed into the flotation cell. The average particle size of the milled slurry was 17 μm with no particles larger than 140 μm. There were not sediments on the bottom of the cell after the flotation cell was drained meaning that all the coal particles floated and all the particles in the pulp were so small that the turbulence kept them in suspension such that they did not sediment to the bottom of the flotation cell.

One flotation reported in Tables 2A-2G was done using slurry that passed through a 0.5 mm sieve. The average particle size was 50 microns with no particle larger than 245 microns (Table 2A). The amount of sediment on the bottom of the cell was negligible, with a particle size of no bigger than 1000 microns (Table 2F). For the same reason already discussed regarding the 0.75 mm pass slurry, the sediments show that there are larger particles in the slurry than was determined in the particle size analysis.

One flotation reported in Tables 2A-2G was done using slurry that passed through a 0.3 mm sieve. The average particle size was 20 microns with no particle larger than 223 microns (Table 2A). The amount of sediment on the bottom of the cell was negligible, with a particle size of no bigger than 550 microns (Table 2F). For the same reason already discussed regarding the 0.75 mm pass slurry, the sediments show that there are larger particles in the slurry than was determined in the particle size analysis.

TABLE 2A

| Slurry Input Parameters | | | | | | | | | |
|---|---|---|---|---|---|---|---|---|---|
| Flotation Cell Input Parameters | | | | | Slurry Input Parameters | | | | |
| | | | | | | | Particle | | |
| Pump Speed (rpm) | Air volumetric velocity (acfm) | Slurry Processing | Bubble Maker Pore Size (μm) | Number of Bubble Makers | Solid Content (wt. %) | Ash Content (wt. %) | Average Particle Size (μm) | Size Standard Deviation (μm) | Largest Particle (μm) |
| 500 | 10.00 | 0.75 mm pass | 3 | 24 | 38.7 | 25.9 | 21 | 27.1 | 245 |
| 550 | 15.00 | 0.75 mm pass | 3 | 24 | 38.1 | 25.9 | 26.9 | 45.6 | 300 |
| 625 | 22.00 | 0.75 mm pass | 3 | 24 | 37.4 | 24.2 | 19.4 | 26.4 | 200 |
| 650 | 25.00 | 0.75 mm pass | 3 | 24 | 37.1 | 26 | 19.4 | 26.4 | 200 |
| 500 | 10.00 | 0.75 mm pass | 6 | 24 | 43.2 | 25.1 | 19.6 | 32.3 | 220 |
| 550 | 15.00 | 0.75 mm pass | 6 | 24 | 43.2 | 25.1 | 19.6 | 32.3 | 220 |
| 575 | 17.5 | 0.75 mm pass | 6 | 24 | 43.2 | 25.1 | 19.6 | 32.3 | 220 |
| 600 | 20.00 | 0.75 mm pass | 6 | 24 | 38.5 | 25.6 | 16 | 21.5 | 220 |
| 500 | 10.00 | milled | 6 | 24 | 48.6 | 24.6 | 16.5 | 21.4 | 140 |
| 550 | 15.00 | milled | 6 | 24 | 43.1 | 24.6 | 16.5 | 21.4 | 140 |
| 550 | 15.00 | 0.3 mm pass | 6 | 24 | 47.2 | 26.3 | 19.8 | 31.7 | 223 |
| 550 | 15.00 | 0.5 mm pass | 6 | 24 | 49.5 | 25.3 | 50.15 | 60 | 245 |
| 450 | 5.00 | 0.75 mm pass | 15 | 6 | 38.3 | 25.5 | 27.5 | 42.6 | 270 |
| 400 | 1.00 | 0.75 mm pass | 30 | 4 | 38.3 | 25.5 | 27.5 | 42.6 | 270 |

TABLE 2B

| Flotation Cell Performance Output Parameters | | | | | | | | | | |
|---|---|---|---|---|---|---|---|---|---|---|
| Flotation Cell Input Parameters | | | | | | Flotation Cell Performance Output Parameters | | | | |
| Pump Speed (rpm) | Air volumetric velocity (acfm) | Slurry Processing | Bubble Maker Pore Size (μm) | Number of Bubble Makers | Slurry Feed Rate on a dry basis (kg/hr) | Clean-up Time (min.) | Flotation Rate (MTPH/m$^2$) | Combustible Recovery (%) | Flotation Efficiency (%) |
| 500 | 10.00 | 0.75 mm pass | 3 | 24 | 127.8 | 20 | 0.27 | 33.7 | 94.3 |
| 550 | 15.00 | 0.75 mm pass | 3 | 24 | 125.8 | 10 | 0.90 | 90.8 | 93.0 |
| 625 | 22.00 | 0.75 mm pass | 3 | 24 | 124.1 | 5 | 1.09 | 95 | 94.2 |
| 650 | 25.00 | 0.75 mm pass | 3 | 24 | 194.2 | 2 | 1.85 | 96.7 | 90.5 |
| 500 | 10.00 | 0.75 mm pass | 6 | 24 | 120.9 | 10 | 0.91 | 94.6 | 94.6 |
| 550 | 15.00 | 0.75 mm pass | 6 | 24 | 115.8 | 8 | 0.92 | 95.1 | 94.6 |
| 575 | 17.5 | 0.75 mm pass | 6 | 24 | 124.5 | 6 | 1.05 | 94.9 | 93.9 |
| 600 | 20.00 | 0.75 mm pass | 6 | 24 | 126.9 | 6 | 1.04 | 93.2 | 93.5 |
| 500 | 10.00 | milled | 6 | 24 | 111.8 | 1.5 | 1.24 | 97 | 94.0 |
| 550 | 15.00 | milled | 6 | 24 | 114.6 | 1.5 | 1.13 | 96.8 | 93.8 |
| 550 | 15.00 | 0.3 mm pass | 6 | 24 | 210.5 | 2.7 | 1.96 | 96.9 | 92.1 |
| 550 | 15.00 | 0.5 mm pass | 6 | 24 | 282.3 | 10 | 2.13 | 95.1 | 91.5 |
| 450 | 5.00 | 0.75 mm pass | 15 | 6 | 137.8 | 10 | 1.00 | 91.62 | 88.1 |
| 400 | 1.00 | 0.75 mm pass | 30 | 4 | 134 | 10 | 0.93 | 87.8 | 84.7 |

TABLE 2C

Bubble Characterization Output Parameters

| Flotation Cell Input Parameters | | | | | | Bubble Characterization Output Parameters | |
|---|---|---|---|---|---|---|---|
| Pump Speed (rpm) | Air volumetric velocity (acfm) | Slurry Processing | Bubble Maker Pore Size (μm) | Number of Bubble Makers | Slurry Feed Rate on a dry basis (kg/hr) | Gas Hold up (vol. %) | air volume in cell ($m^3$) |
| 500 | 10.00 | 0.75 mm pass | 3 | 24 | 127.8 | 1.2 | 0.007 |
| 550 | 15.00 | 0.75 mm pass | 3 | 24 | 125.8 | 5.3 | 0.013 |
| 625 | 22.00 | 0.75 mm pass | 3 | 24 | 124.1 | 14.4 | 0.025 |
| 650 | 25.00 | 0.75 mm pass | 3 | 24 | 194.2 | 17.9 | 0.039 |
| 500 | 10.00 | 0.75 mm pass | 6 | 24 | 120.9 | 5.9 | 0.019 |
| 550 | 15.00 | 0.75 mm pass | 6 | 24 | 115.8 | 13.2 | 0.028 |
| 575 | 17.5 | 0.75 mm pass | 6 | 24 | 124.5 | 17.0 | 0.031 |
| 600 | 20.00 | 0.75 mm pass | 6 | 24 | 126.9 | 19.5 | 0.034 |
| 500 | 10.00 | milled | 6 | 24 | 111.8 | 5.9 | 0.019 |
| 550 | 15.00 | milled | 6 | 24 | 114.6 | 13.2 | 0.028 |
| 550 | 15.00 | 0.3 mm pass | 6 | 24 | 210.5 | 13.2 | 0.028 |
| 550 | 15.00 | 0.5 mm pass | 6 | 24 | 282.3 | 13.2 | 0.028 |
| 450 | 5.00 | 0.75 mm pass | 15 | 6 | 137.8 | 7.7 | 0.019 |
| 400 | 1.00 | 0.75 mm pass | 30 | 4 | 134 | 9.9 | 0.024 |

TABLE 2D

Froth Output Parameters

| Flotation Cell Input Parameters | | | | | Froth Output Parameters | | | |
|---|---|---|---|---|---|---|---|---|
| Pump Speed (rpm) | Air volumetric velocity (acfm) | Slurry Processing | Bubble Maker Pore Size (μm) | Number of Bubble Makers | Solids Content (wt. %) | Ash Content (wt. %) | Average Particle Size (μm) | Largest Particle Size (μm) |
| 500 | 10.0 | 0.75 mm pass | 3 | 24 | 30.8 | 5.7 | 13.9 | 130 |
| 550 | 15.0 | 0.75 mm pass | 3 | 24 | 26.0 | 7.0 | 21.2 | 140 |
| 625 | 22.0 | 0.75 mm pass | 3 | 24 | 18.6 | 5.8 | 61.3 | 400 |
| 650 | 25.0 | 0.75 mm pass | 3 | 24 | 14.0 | 9.5 | 50.8 | 300 |
| 500 | 10.0 | 0.75 mm pass | 6 | 24 | 26.3 | 5.4 | 32.2 | 115 |
| 550 | 15.0 | 0.75 mm pass | 6 | 24 | 25.6 | 5.4 | 67.8 | 125 |
| 575 | 17.5 | 0.75 mm pass | 6 | 24 | 23.9 | 6.1 | 32.1 | 220 |
| 600 | 20.0 | 0.75 mm pass | 6 | 24 | 17.4 | 6.5 | 37.3 | 200 |
| 500 | 10.0 | milled | 6 | 24 | 26.3 | 6.0 | 18.6 | 200 |
| 550 | 15.0 | milled | 6 | 24 | 25.7 | 6.2 | 18.4 | 200 |
| 550 | 15.0 | 0.3 mm pass | 6 | 24 | 22.7 | 7.9 | 79.3 | 350 |
| 550 | 15.0 | 0.5 mm pass | 6 | 24 | 20.7 | 8.5 | 61.2 | 600 |
| 450 | 5.0 | 0.75 mm pass | 15 | 6 | 15.0 | 11.9 | 55.0 | 100 |
| 400 | 1.0 | 0.75 mm pass | 30 | 4 | 15.3 | 15.3 | 70.0 | 750 |

TABLE 2E

Tailings Output Parameters

| Flotation Cell Input Parameters | | | | | Tailings Output Parameters | | | |
|---|---|---|---|---|---|---|---|---|
| Pump Speed (rpm) | Air volumetric velocity (acfm) | Slurry Processing | Bubble Maker Pore Size (μm) | Number of Bubble Makers | Solids Content (wt. %) | Ash Content (wt. %) | Average Particle Size (μm) | Largest Particle (μm) |
| 500 | 10.00 | 0.75 mm pass | 3 | 24 | 5.4 | 42.2 | 13.7 | 130 |
| 550 | 15.00 | 0.75 mm pass | 3 | 24 | 4.1 | 89.6 | 7.6 | 73 |
| 625 | 22.00 | 0.75 mm pass | 3 | 24 | 2 | 88.9 | 8.7 | 30 |
| 650 | 25.00 | 0.75 mm pass | 3 | 24 | 2.7 | 90.4 | 7.8 | 60 |
| 500 | 10.00 | 0.75 mm pass | 6 | 24 | 2.1 | 87.8 | 7 | 115 |
| 550 | 15.00 | 0.75 mm pass | 6 | 24 | 2.5 | 88.4 | 6.2 | 60 |
| 575 | 17.5 | 0.75 mm pass | 6 | 24 | 2.1 | 91.3 | 7 | 35 |
| 600 | 20.00 | 0.75 mm pass | 6 | 24 | 3 | 90 | 7.1 | 32 |
| 500 | 10.00 | milled | 6 | 24 | 2.1 | 89.3 | 7.6 | 60 |
| 550 | 15.00 | milled | 6 | 24 | 1.7 | 89.9 | 7.2 | 40 |
| 550 | 15.00 | 0.3 mm pass | 6 | 24 | 3.3 | 90.1 | 7.2 | 40.0 |

TABLE 2E-continued

| Tailings Output Parameters | | | | | | | | |
|---|---|---|---|---|---|---|---|---|
| Flotation Cell Input Parameters | | | | | Tailings Output Parameters | | | |
| Pump Speed (rpm) | Air volumetric velocity (acfm) | Slurry Processing | Bubble Maker Pore Size (μm) | Number of Bubble Makers | Solids Content (wt. %) | Ash Content (wt. %) | Average Particle Size (μm) | Largest Particle (μm) |
| 550 | 15.00 | 0.5 mm pass | 6 | 24 | 6.8 | 90.0 | 9.5 | 40.0 |
| 450 | 5.00 | 0.75 mm pass | 15 | 6 | 4.3 | 82.5 | 8 | 35 |
| 400 | 1.00 | 0.75 mm pass | 30 | 4 | 2.7 | 80.1 | 9.3 | 40 |

TABLE 2F

| Sediment Output Parameters | | | | | | | | | |
|---|---|---|---|---|---|---|---|---|---|
| Flotation Cell Input Parameters | | | | | Sediment Output Parameters | | | | |
| Pump Speed (rpm) | Air volumetric velocity (acfm) | Slurry Processing | Bubble Maker Pore Size (μm) | Number of Bubble Makers | Solids Content (wt. %) | Ash Content (wt. %) | Average Particle Size (μm) | Largest Particle Size (μm) | Sediment as a % of Total Tailings (wt. %) |
| 500 | 10.00 | 0.75 mm pass | 3 | 24 | 66.1 | 55 | 247.5 | 1200 | 15.4 |
| 550 | 15.00 | 0.75 mm pass | 3 | 24 | 71.1 | 56.9 | 464.6 | 1200 | 19.7 |
| 625 | 22.00 | 0.75 mm pass | 3 | 24 | 70.4 | 64.1 | 517.9 | 1200 | 24.7 |
| 650 | 25.00 | 0.75 mm pass | 3 | 24 | 71.4 | 74.4 | 446 | 1200 | 14.6 |
| 500 | 10.00 | 0.75 mm pass | 6 | 24 | 44.3 | 45.5 | 371.1 | 1100 | 11.7 |
| 550 | 15.00 | 0.75 mm pass | 6 | 24 | 67.4 | 43.7 | 416.3 | 1100 | 13.2 |
| 575 | 17.5 | 0.75 mm pass | 6 | 24 | 73.2 | 44.7 | 387.6 | 1100 | 26 |
| 600 | 20.00 | 0.75 mm pass | 6 | 24 | 75.2 | 66.7 | 457.3 | 1100 | 29.2 |
| 500 | 10.00 | milled | 6 | 24 | none | none | none | none | none |
| 550 | 15.00 | milled | 6 | 24 | none | none | none | none | none |
| 550 | 15.00 | 0.3 mm pass | 6 | 24 | 74.7 | 81.9 | 168.5 | 550 | 4.7 |
| 550 | 15.00 | 0.5 mm pass | 6 | 24 | 84.7 | 69.4 | 460.9 | 1000 | 4.8 |
| 450 | 5.00 | 0.75 mm pass | 15 | 6 | 66.2 | 43.4 | 412.5 | 1200 | 2.9 |
| 400 | 1.00 | 0.75 mm pass | 30 | 4 | 68.8 | 39.2 | 332.4 | 1200 | 13.6 |

TABLE 2G

| Surry Input and Froth Output Comparison | | | | | | | |
|---|---|---|---|---|---|---|---|
| Slurry Input Parameters | | | | Froth Output Parameters | | | |
| Solid Content (wt. %) | Ash Content (X wt. %) | Average Particle Size (μm) | Particle Size Standard Deviation (μm) | Solids Content (wt. %) | Ash Content (wt. %) | Average Particle Size (μm) | Ash Reduction (% X) |
| 38.7 | 25.9 | 21 | 27.1 | 30.8 | 5.7 | 13.9 | 22 |
| 38.1 | 25.9 | 26.9 | 45.6 | 26.0 | 7.0 | 21.2 | 27 |
| 37.4 | 24.2 | 19.4 | 26.4 | 18.6 | 5.8 | 61.3 | 24 |
| 37.1 | 26 | 19.4 | 26.4 | 14.0 | 9.5 | 50.8 | 37 |
| 43.2 | 25.1 | 19.6 | 32.3 | 26.3 | 5.4 | 32.2 | 22 |
| 43.2 | 25.1 | 19.6 | 32.3 | 25.6 | 5.4 | 67.8 | 22 |
| 43.2 | 25.1 | 19.6 | 32.3 | 23.9 | 6.1 | 32.1 | 24 |
| 38.5 | 25.6 | 16 | 21.5 | 17.4 | 6.5 | 37.3 | 25 |
| 48.6 | 24.6 | 16.5 | 21.4 | 26.3 | 6.0 | 18.6 | 24 |
| 43.1 | 24.6 | 16.5 | 21.4 | 25.7 | 6.2 | 18.4 | 25 |
| 47.2 | 26.3 | 19.8 | 31.7 | 22.7 | 7.9 | 79.3 | 30 |
| 49.5 | 25.3 | 50.15 | 60 | 20.7 | 8.5 | 61.2 | 33 |
| 38.3 | 25.5 | 27.5 | 42.6 | 15.0 | 11.9 | 55.0 | 47 |
| 38.3 | 25.5 | 27.5 | 42.6 | 15.3 | 15.3 | 70.0 | 60 |

Example 7

Combustible Recovery

Combustible recovery of a coal flotation cell is defined as $C_{out}/C_{in}$, where $C_{out}$ represents the total coal particle (carbon) content in the coal-froth output (measured on a dry basis) and $C_{in}$ represents the total coal particle (carbon) content in the aqueous slurry of coal fines input (measured on a dry basis). Traditionally, combustible recovery is shown to increase with increasing ash content in the coal-froth. In these prior systems, in order to recover a higher percentage of the coal, the system must be "pulled harder." In so doing, more ash is forced out of the top of the flotation cell with the overflowing coal-froth. One way to "pull harder" on a flotation system is to introduce more air into the column per unit time.

Figure 2:
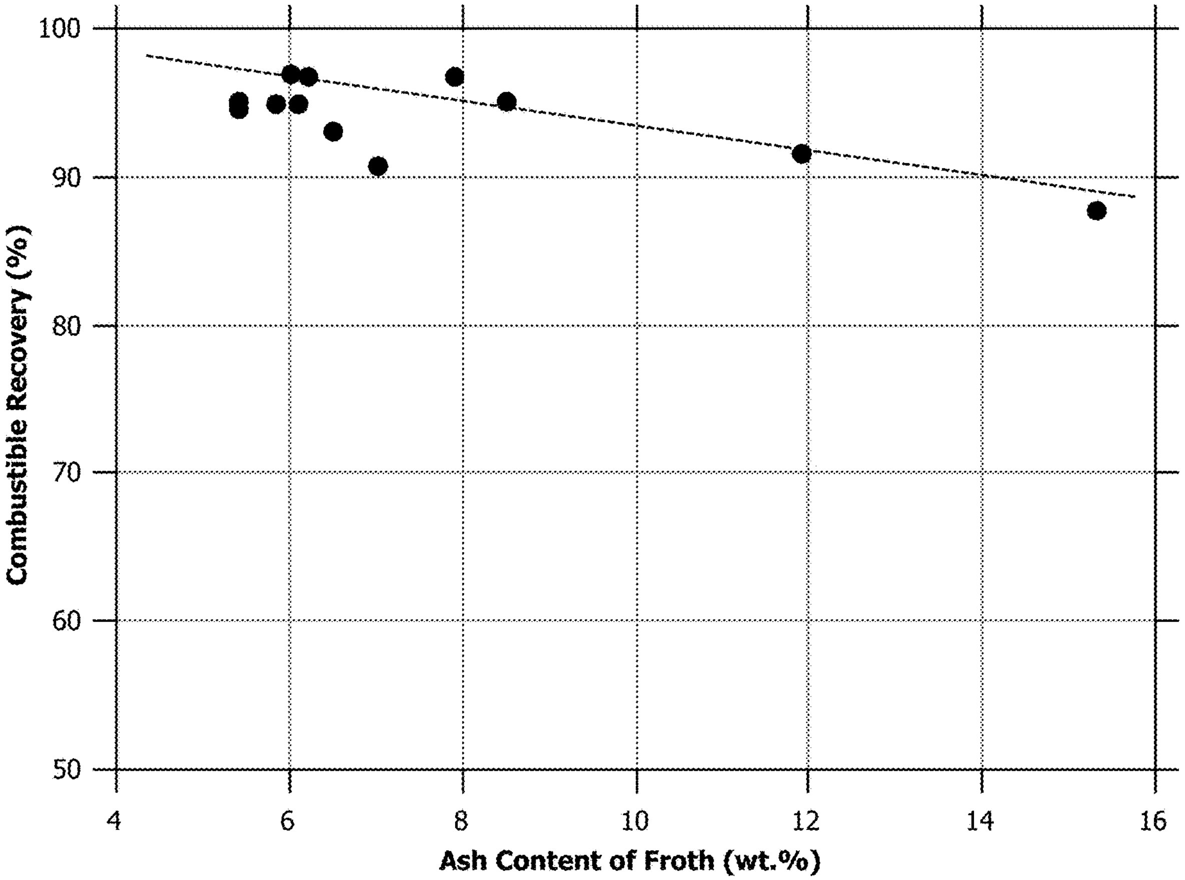
FIG. 2 is a graph of combustible recovery percentage as a function of ash content of the coal-froth (wt. %) showing high combustible recovery in combination with low ash content of the coal-froth.

In contrast, as shown by the data in FIG. 2 for different runs collected using the flotation technology described herein where fine bubble are generated with microporous bubble generators, combustible recovery decreases slightly with increasing ash content. In the flotation process described herein, fine and ultrafine coal particles are floated efficiently and selectively, meaning the hydrophobic ultra-fine coal particles float in the column and are collected in the overflowing coal-froth while the hydrophilic ash-forming mineral content particles remain in the water-bubble region. Additionally, in the ultrafine size range, little to no ash-forming mineral content material is entrapped in the coal particles. Thus, the ability to efficiency float ultrafine coal particles results in high flotation efficiency.

Figure 3:
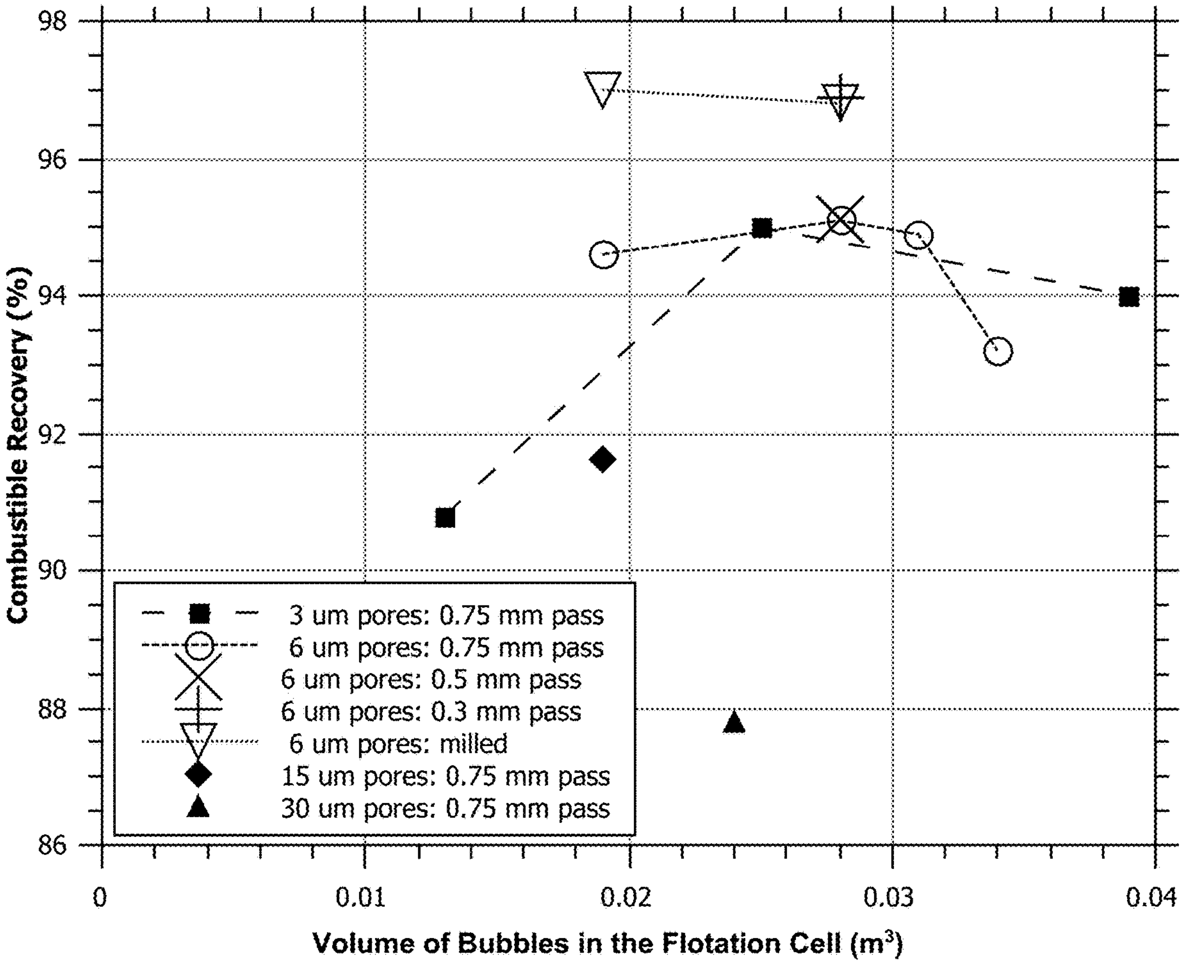
FIG. 3 is a graph of combustible recovery percentage as a function of volume of bubbles in the flotation cell.

FIG. 3 plots the combustible recovery as a function of the volume of the bubbles in the flotation cell. The bubble volume was calculated by measuring the change in water height when air was introduced into the column through the bubble generators at different flow rates. Higher air flow rates resulted in a larger volume of the bubbles. The volume of the bubbles can be considered a measurement of how many bubbles are in the flotation cell because the number of bubbles equals the volume of the bubbles divided by the average volume of one bubble. For the two data sets obtained using bubble generators with 6 μm pores, regular slurry (#1) and milled slurry (#2), the general trend is that combustible recovery decreased with increased volume of the bubbles (or greater number of bubbles in the flotation cell). One might expect that a larger number of bubbles in the flotation cell would result in a higher combustible recovery because there is a higher probability that coal will come in contact with a bubble, become attached to a bubble, and float to the top of the flotation cell to be collected in the coal-froth product. For the first two data points from 6 μm pores (#1 regular slurry), combustible recovery did in fact increase as more bubbles were introduced into the flotation cell going from 94.6% to 95.1% for 0.019 and 0.028 $m^3$ respectively. Beyond 0.028 $m^3$, combustible recovery decreases sharply.

Without being bound by theory, it is presently believed that the decrease in combustible recovery at the higher volume of the bubbles can be explained by turbulence. As the volume of the bubbles (number of bubbles in the flotation cell) increased, turbulence in the flotation cell also increased. It is presently believed too much turbulence within the flotation cell causes coal particles to become detached from the bubbles as the bubbles float to the top of the cell resulting in coal particles remaining suspended in the tailings and preventing them from reaching the coal-froth product, thereby decreasing the combustible recovery.

Thus, beyond a certain volume of the bubbles, or number of bubbles in the flotation cell, for a given bubble generator pore size, turbulence is too high and combustible recovery decreases. The turbulence in the flotation cell increased for the bubble generators with average pore sizes 15 μm and 30 μm, resulting in further reduction of combustible recovery when these bubble generators were used in comparison to when the bubble generators with an average pore size of 6 μm were used. The data for the bubble generators with an average pore size of 3 μm is lower than expected. As seen in FIG. 3, the combustible recovery for 3 μm pore bubble generators is significantly lower than 6 μm bubble generators. This may be due to insufficient volume of bubbles. It is believed that with a greater volume of the bubbles (i.e. greater number of bubbles) using 3 μm pore size bubble generators in the flotation cell the combustible recovery will also increase until turbulence begins to override gains in combustible recovery as was seen for the 6 μm pore bubble generators.

Example 8

Sedimentation

Figure 4:
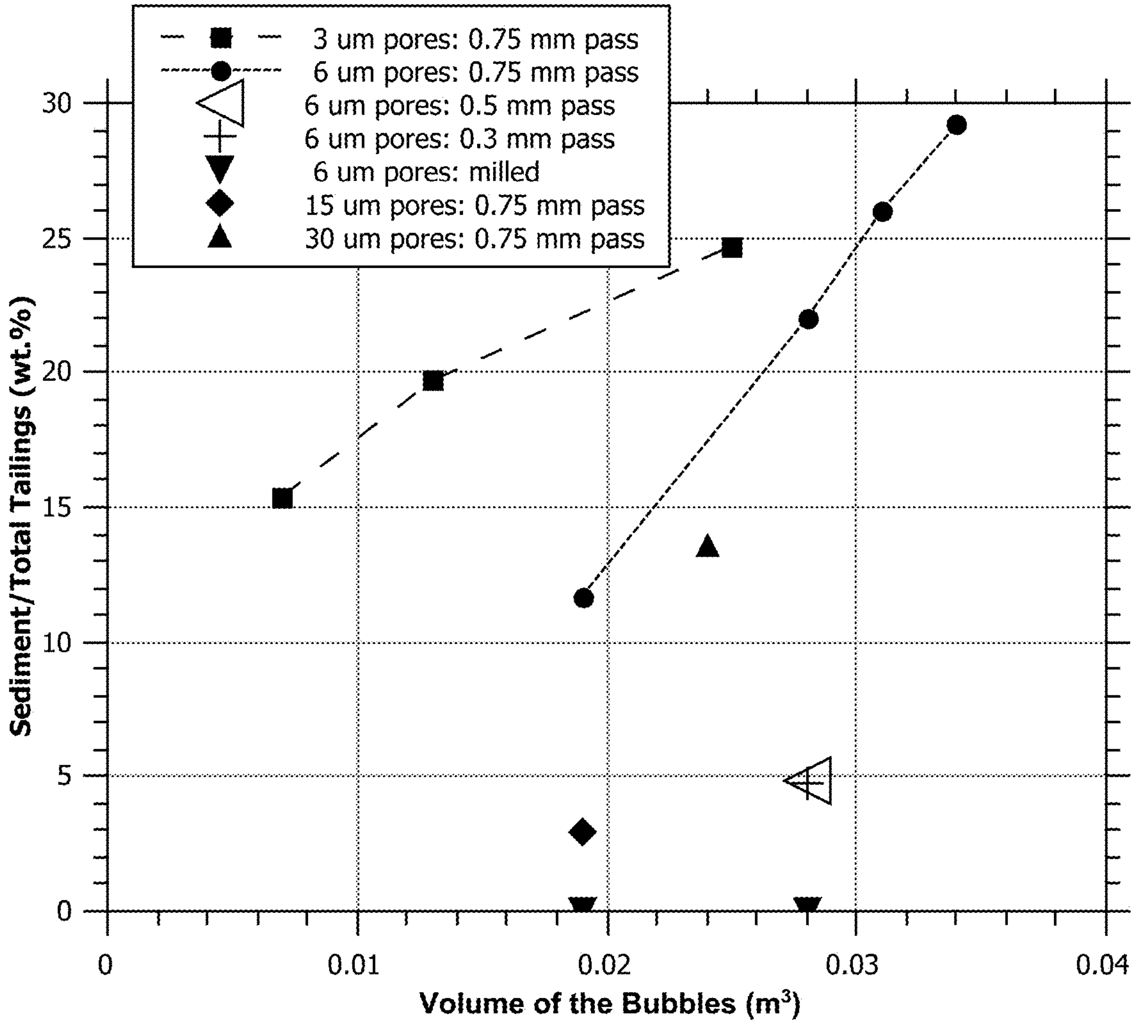
FIG. 4 is a graph of sedimentation percentage (sediments/total underflow) on a dry basis as a function of the volume of the bubbles in the flotation cell.

After completing a flotation cycle and draining the tailings from the flotation cell, sedimentation of larger coal and ash particles was observed on the bottom of the flotation cell. This sedimentation was gathered and analyzed for moisture content, ash content, and particle size and included as part of the total underflow in the combustible recovery calculations as summarized in Table 2F. FIG. 4 plots the percentage of sedimentation (sediments/total underflow) on a dry basis as a function of the volume of the bubbles in the flotation cell. As the volume of the bubbles in the flotation cell increased (see trends for 6 μm pore size (#1 regular slurry) and 3 μm pore size data sets), the wt. % sediments also increased and may be explained by the increase in turbulence discussed previously. It is believed the larger particles are more easily detached from the bubbles in a more turbulent flotation cell. The data suggests many of the larger particles settle against the upward flotation current to the bottom of the flotation cell during the flotation cycle. In fact, the settling rate increased with increased turbulence for the 6 μm pore size (#1 regular slurry) and 3 μm pore size data sets.

In the previous graph the low combustible recovery for the 15 μm and 30 μm pore size bubble generators was explained by increased turbulence observed with these larger pore size bubble generators because coal particles were detached from the bubbles and not collected in the coal-froth product. FIG. 4 suggests that less sedimentation is occurring for the 15 μm and 30 μm pore size bubble generators even though they produced more turbulent flotation environment. A competitive, dynamic process is occurring where the coal particles are attaching and detaching to the larger bubbles produced by the 15 μm and 30 μm bubble generators because of the turbulence. Thus the larger particles are constantly floating and sinking in the flotation cell, especially when the 15 μm and 30 μm pore size bubble generators are used and do not settle to the bottom of the flotation cell during the flotation cycle at as high of rates as occurs for bubbles made from the 3 μm and 6 μm bubble generators.

Figure 5:
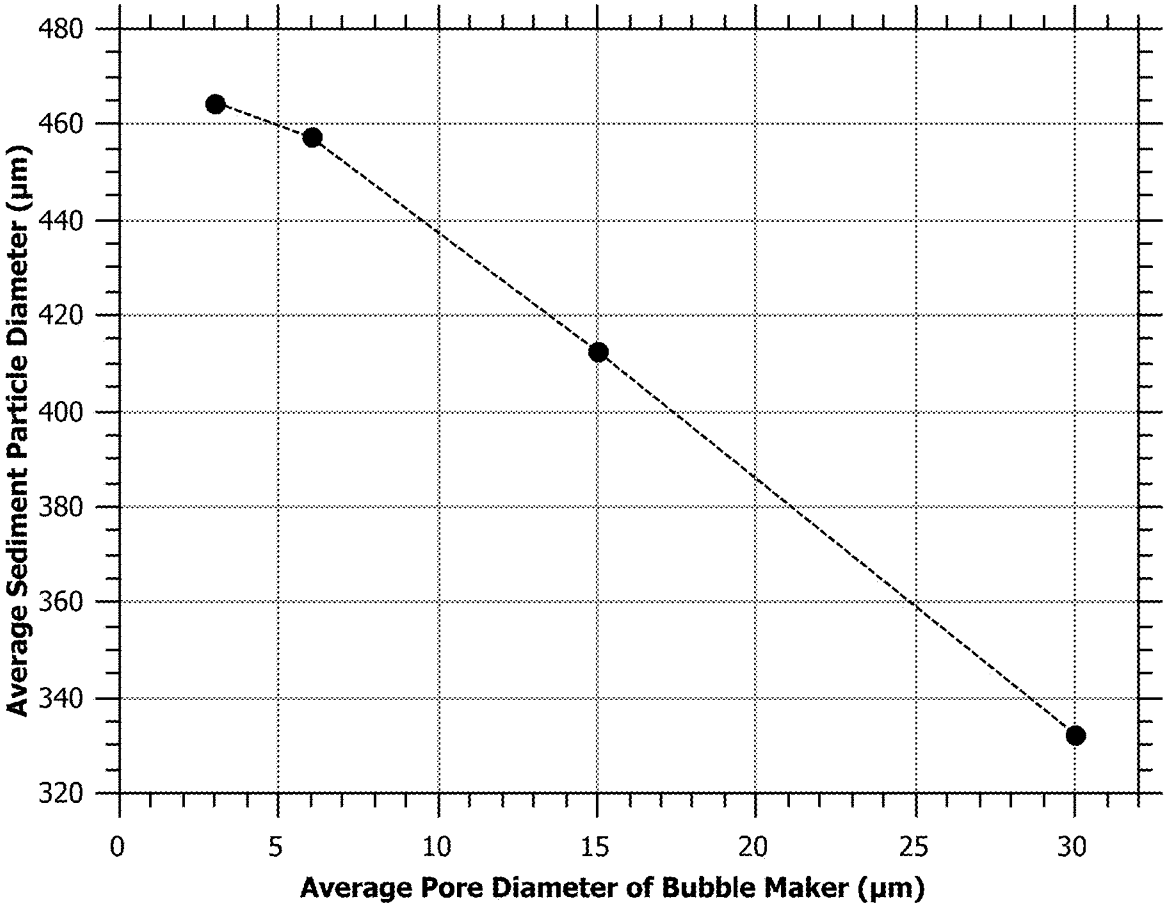
FIG. 5 is a graph of average sediment particle size as a function of the average pore diameter of the bubble generators.

FIG. 5 shows the average sediment particle size plotted as a function of the average pore diameter of the bubble generators. For the regular slurry, the average sediment particle size decrease as expected as the average pore diameter of the bubble generators increased because the larger bubbles produced by the larger pore size bubble generators can float larger particles due to greater buoyancy. The milled slurry has an average sediment particle size of zero because there was no sediment. The fact that there were no sediment particles with the milled slurry is important. It demonstrates that flotation with microporous ceramic or plastic bubble generators is very efficient at floating ultrafine coal particles below 300 μm in diameter. In fact, virtually all of the milled coal particles floated because the combustible recovery for the milled slurry with 6 μm average pore size bubble generators was 97%.

Example 9

Correlation Between Combustible Recovery and Ash Content of the Tailings

Figure 6:
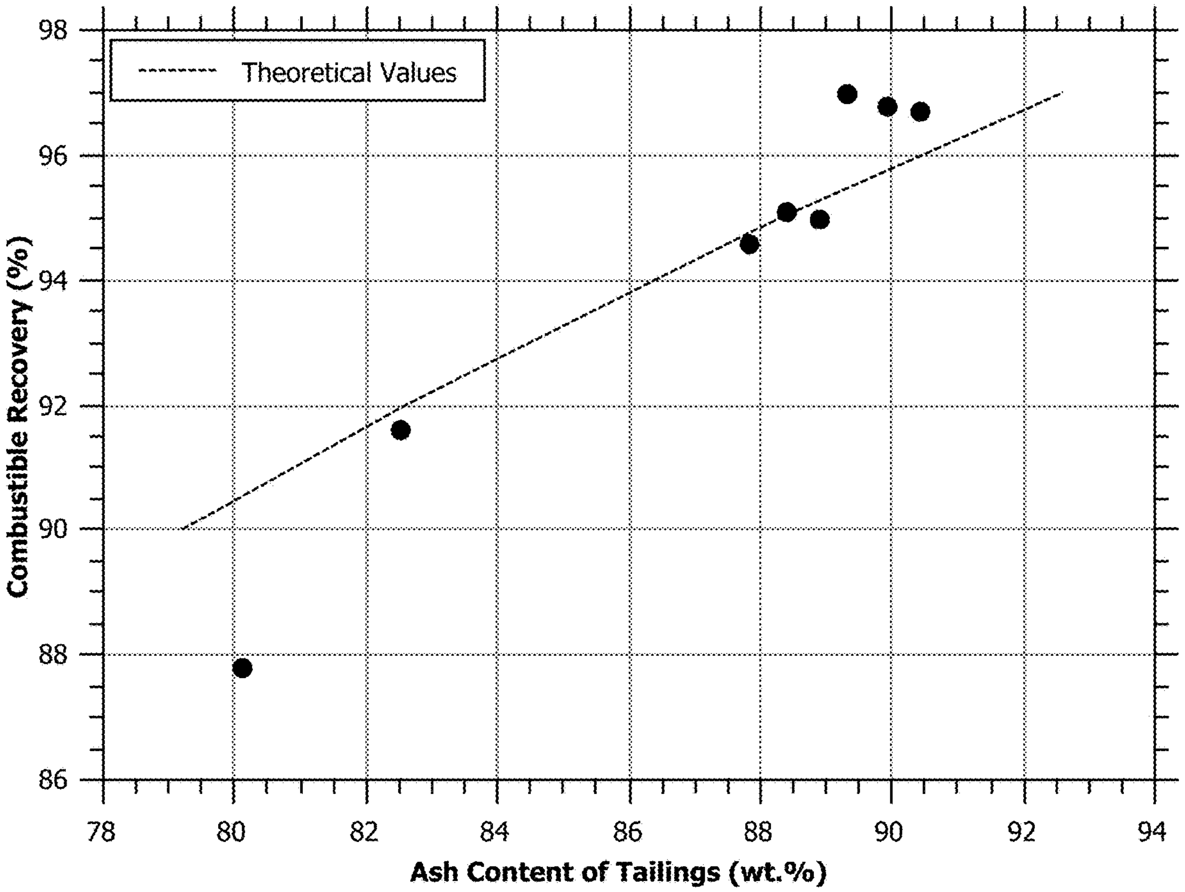
FIG. 6 is a graph of the combustible recovery as a function of ash content of the tailings showing that ash content of the tailings can be used to predict combustible recovery.

As more coal is floated out of the flotation cell, less coal is left behind in the tailings. The combustible recovery as a function of ash content of the tailings for a given coal feed (25 to 30 wt. % ash) was calculated and plotted in FIG. 6. It can be seen that the calculated values match up well with the experimental values. As such, the ash content of the tailings can in fact be an indicator for combustible recovery. The higher the ash content of the tailings (i.e. the lower the carbon content of the tailings), the higher the combustible recovery.

Example 10

Correlation Between Bubble Generator Pore Size and Coal-Froth Particle Size

Figure 7:
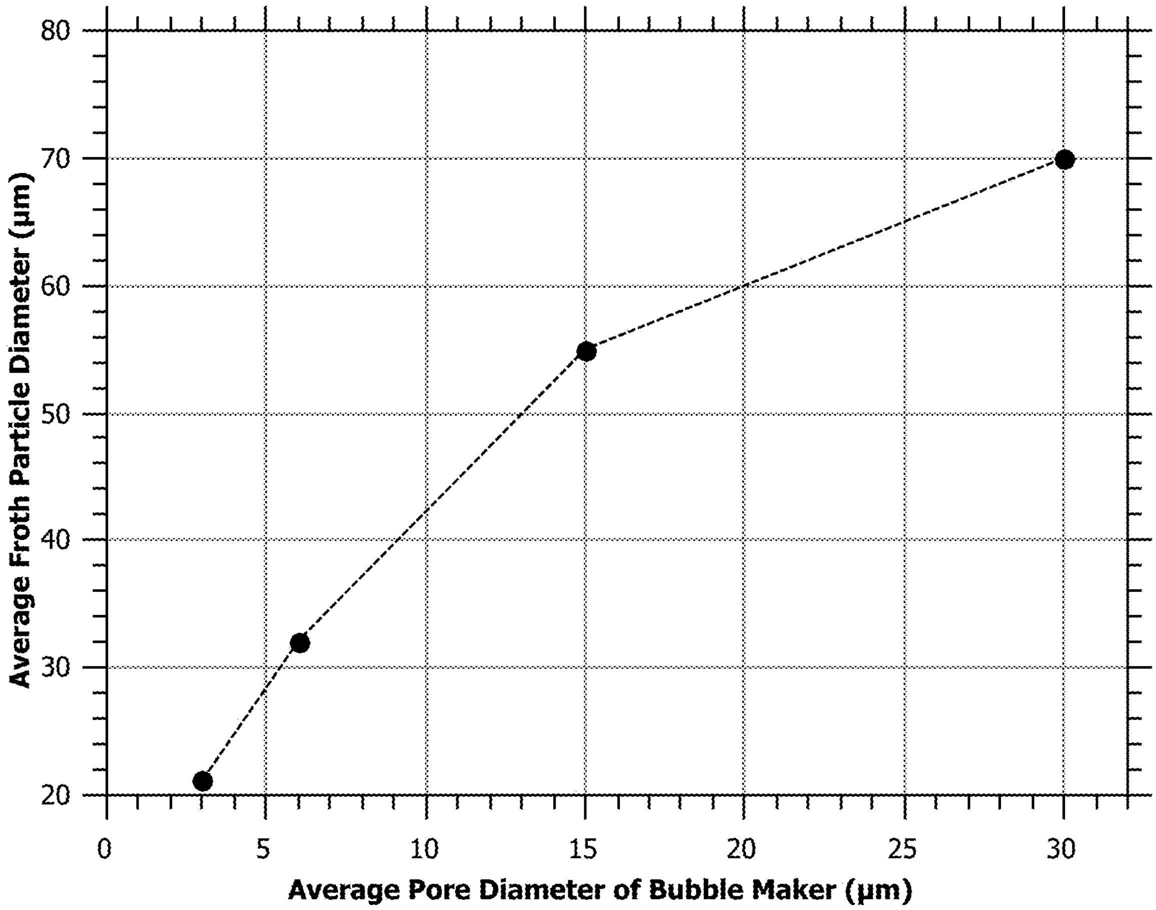
FIG. 7 is a graph of average coal-froth particle size that is floated as a function of bubble generator average pore diameter showing that larger bubbles can float larger particles.

FIG. 7 shows the average coal-froth particle diameter that is floated for bubble generators with different average pore diameter. As the average pore diameter increases, the average coal-froth particle size also increases. This is expected because a large bubble will be made from a larger pore size. Larger bubbles have greater buoyancy and thus can float larger particles that become attached to the larger bubbles.

Example 11

Flotation Rate

Figure 8:
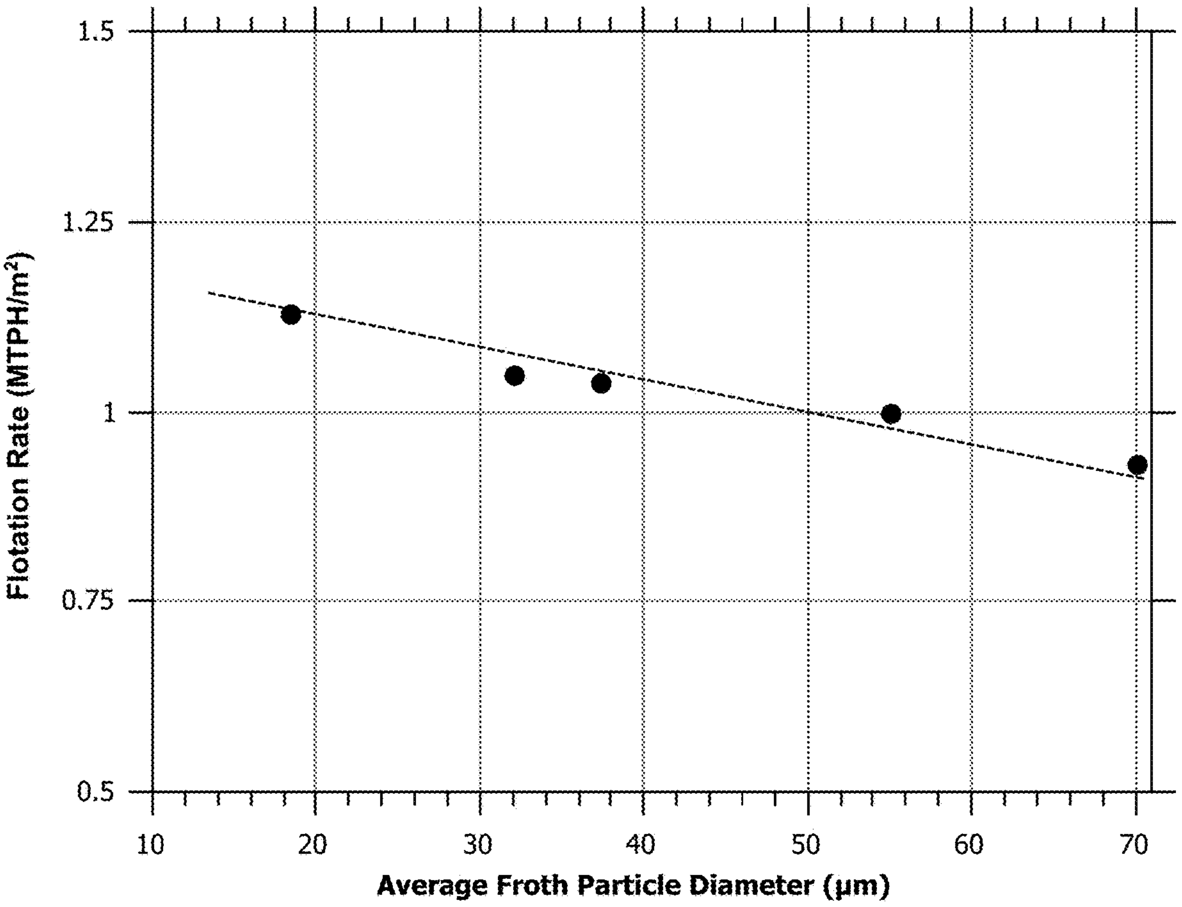
FIG. 8 is a graph of the carrying capacity as a function of the average froth particle diameter.

Flotation rate is the rate at which dry product exits the flotation column in the froth divided by the cross sectional area of the flotation cell. FIG. 8 plots the Flotation Rate as a function of average froth particle diameter. As discussed above, theory suggests that smaller bubbles should have a greater flotation rate than larger bubbles. The data in this graph corroborates that theory in that the flotation rate measured for bubbles made from bubble generator 6 μm pores >15 μm pores >30 μm pores.

It is generally believed in the coal flotation industry that flotation rate decreases for particle sizes greater than 500 microns and for particle sizes lower than 100 microns. The reason for reduced carrying capacity of coal particles greater than 500 microns is that these larger particles tend to detach from the bubbles because of their mass, thus reducing flotation rate. The reason for reduced carrying capacity of ultrafine coal particles less than 100 microns is that these small particles can slip past the bubbles in the current surrounding the bubbles as they rise through the column without attaching. For the data shown in the FIG. 8, flotation vs. average froth particle diameter, two different particles sizes are reported for flotations performed with the 6 μm pore bubble generators: 32 μm average froth particle diameter and particles as large as 1200 μm (see sediment in Table 2F) for flotations using the unmilled slurry (6 μm pore #1) and 16 μm average froth particle diameter and particles as large as 140 μm for flotations performed using the milled slurry (6 μm pore #2). These results are opposite to the commonly held view that carrying capacity decreases as particle size decreases in the ultrafine coal regime (less than 100 um). Instead, carrying capacity increases by 18% when going from 32 μm to 16 μm average froth particle diameter. Thus, using the flotation technology described herein, carrying capacity can in fact increase and is not compromised when particle size is reduced when doing flotation separation of fine and ultrafine coal particles as particle size is reduced. The ability to efficiently float ultrafine coal particles (<100 μm) may provide opportunities to recover valuable coal fines from many waste sites that are abandoned because the waste is considered to be in the ultrafine size range and therefore hard to float and recover. Additionally disclosed herein, as the particle size goes to the ultrafine range (<100 μm) there is little to no entrained ash in the coal particles.

Figure 9:
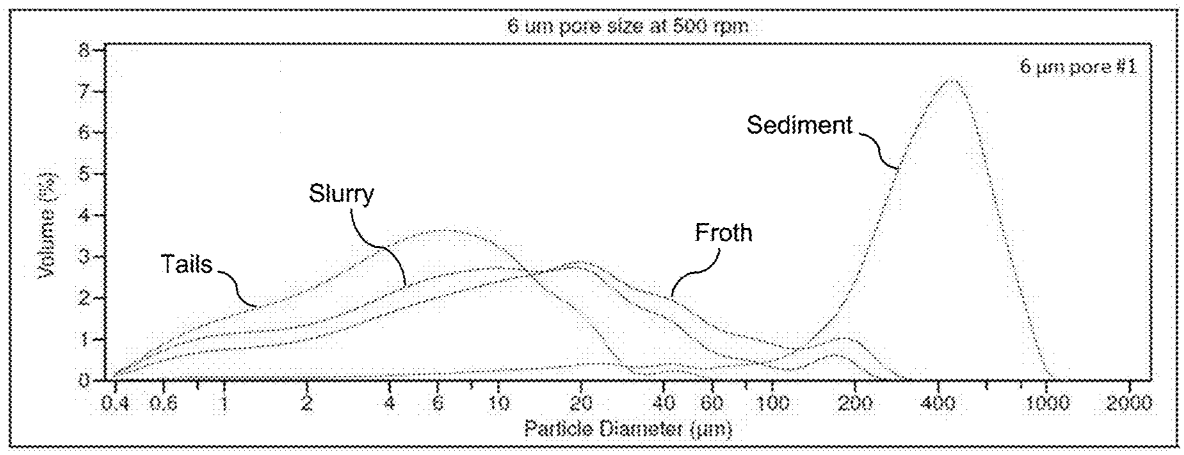
FIG. 9 is a graph of the particle size distribution for slurry, coal-froth, tailings, and sediment for flotations using an unmilled slurry.
Figure 10:
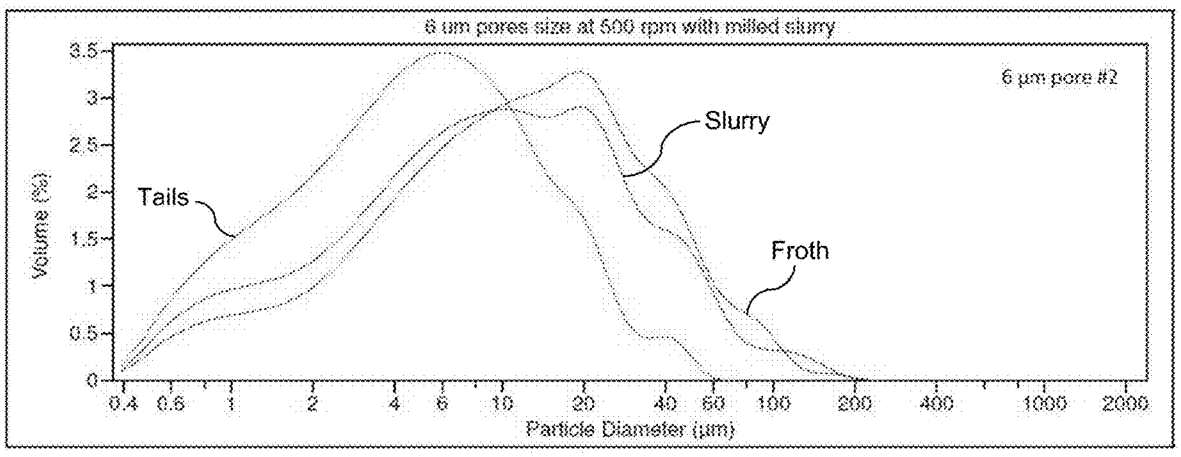
FIG. 10 is a graph of the particle size distribution for slurry, coal-froth, and tailings for flotations using a milled slurry.

FIGS. 9 and 10 show the particle size distribution for slurry, coal-froth, tailings, and sediment (if any) for flotations using an unmilled slurry (6 μm pore #1) and a milled slurry (6 μm pore #2). The particle diameter in the un-milled slurry (6 μm pore #1) extends up to about 400 μm. The particle diameter in the milled slurry (6 μm pore #2) is no larger than 200 μm. As a result, the froth particle size distribution for the milled slurry is smaller than for the un-milled slurry, resulting in smaller average particle sizes. The tailings particle size distribution is very similar. As already discussed, no sedimentation was observed for the milled slurry because all the particles are below 200 μm. The particle size of the sediments that did not float for the flotation using the un-milled slurry peaked at 400 microns. It is observed that the coal-froth from the milled slurry (FIG. 10) has a smaller particle size than the coal-froth of the un-milled slurry (FIG. 9) when floated with 6 μm pore bubble generators at the same air volume or blower operating rpm, 500 rpm in these cases.

Example 12

Content of Coal-Froth and the Pulp

A continuous batch-like coal flotation process is described herein in relation to a 17.5 inch (0.444 m) diameter by 6 foot (1.83 m) tall flotation cell. The flotation cell is filled with clarified water with the blower going to the bubble generators. The bubble-water region reaches the designated level, which is typically 1 foot (0.305 m) below the top rim of the flotation cell. During the flotation separation process, underflow or tailings are not drained continuously. Rather, the concentration of ash-forming mineral content continuously builds up inside the bubble-water region (pulp) as more and more coal particles float out of the column and ash-forming mineral content particles are left behind.

The coal flotation process described herein targets a 50 wt. % solids froth product leaving the top of the flotation cell. That means the froth consists of 50 wt % solids and 50 wt. % water. Approximately 95 wt. % of the solids are coal particles on a dry basis. The large majority of the hydrophobic coal particles reach the froth via flotation on bubbles in the pulp that float up and coalesce to form froth. Some of the coal particles are included as suspended coal particles in the pulp. The skin that makes up the bubbles consists of a thin film of water and frother. This thin film does not make up the whole of the 50 wt. % moisture of the froth. Some of the pulp water is included in the froth interstitially between large froth bubbles. Either in the skin of the bubbles or as interstitial water, the water in the froth is from the pulp and contains ash-forming mineral content particles that were suspended in the pulp. Since the pulp water is the source of the water in the froth, be it bubble skins or interstitial water, the higher the concentration of ash-forming mineral content particles in the pulp, the larger the mass of ash-forming mineral content particles that are included in the coal-froth through entrainment in the pulp water.

An experiment was run where the coal was floated in a 17.5 inch (0.444 m) diameter by 6 foot (1.83 m) tall flotation cell where froth was collected as it overflowed the cell every 10 minutes for 50 minutes. The pulp was also sampled at each time interval from a sampling port at 3 foot (0.91 m). The slurry addition rate was 5 kg/minute, the slurry was 35 wt. % solids, and the slurry was 25 wt. % ash on a dry basis.

Figure 11:
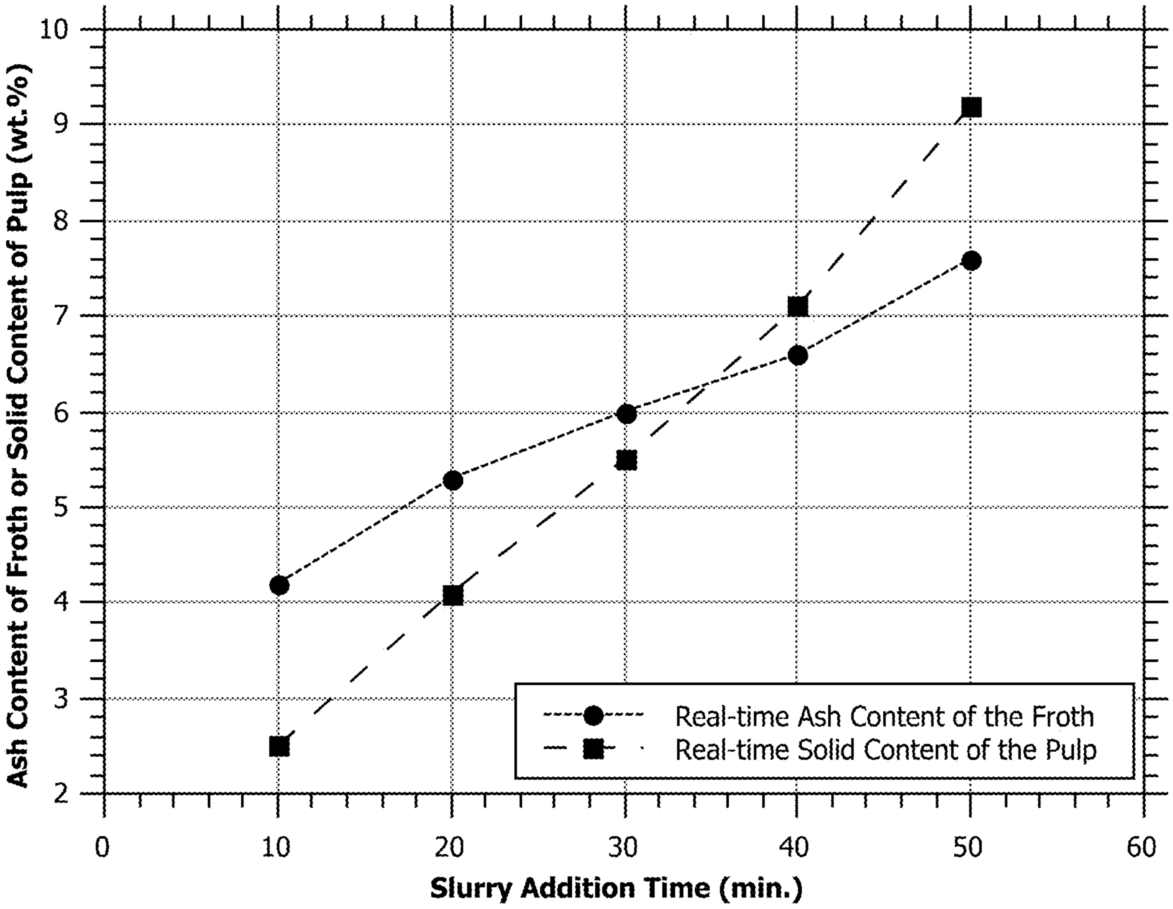
FIG. 11 is a graph of wt. % of the ash content of the coal-froth and the solid content of the pulp as a function of slurry addition time.
Figure 12:
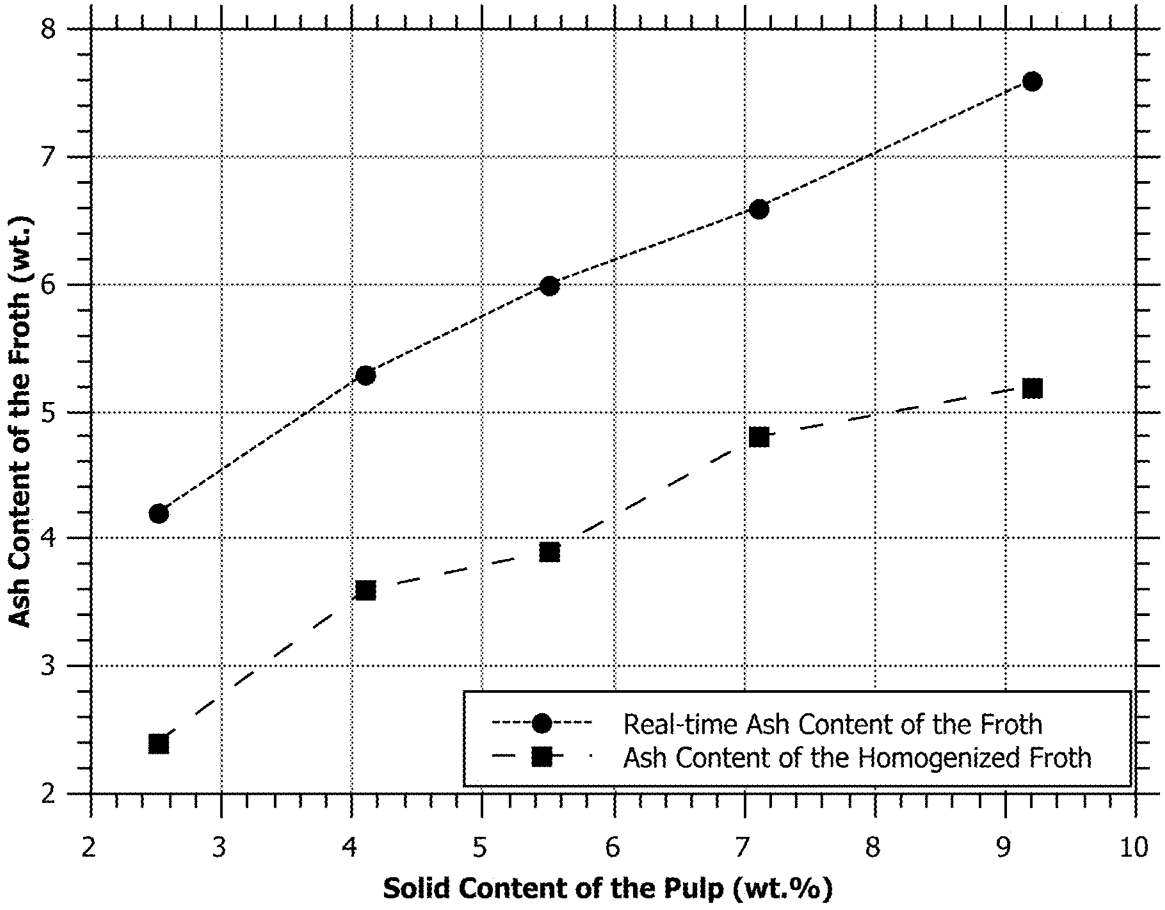
FIG. 12 is a graph of ash content of the instantaneous froth as a function of solid content of the pulp.

FIG. 11 plots wt. % of the ash content of the coal-froth and the solid content of the pulp as a function of slurry addition time. Correspondingly, FIG. 12 plots ash content of the instantaneous froth as a function of solid content of the pulp. Instantaneous froth is the froth as it is overflowing the column. Through the data in FIGS. 11 and 12, it is seen that as the solid content in the pulp (bubble-water region) increases with time, the ash content of the instantaneous froth also increases. Furthermore, there is a near linear relationship between the ash content of the instantaneous froth and the solid content of the pulp. Hence, the solid content of the pulp can be used as a control metric to decide when to stop feeding slurry into the flotation cell and begin the cleanup cycle of the continuous batch-like process. At each 10 minute interval, the entirety of the collected froth was mixed well to homogenize it and was also sampled (homogenized froth).

FIG. 12 also plots the ash content of the homogenized froth vs. solid content of the pulp. The homogenized froth has a lower ash content than the instantaneous froth because it is an average ash content for the whole run. For the conditions under which this experiment was run (slurry feed rate, slurry solid content, and slurry ash content), if the target ash content of the homogenized froth is 5 wt. %, then the column can be run until the solid content of the pulp is just over 7 wt. %, which translates to about 40 minute slurry addition time.

Example 13

Content of Coal-Froth and Bubble Volume

Figure 13:
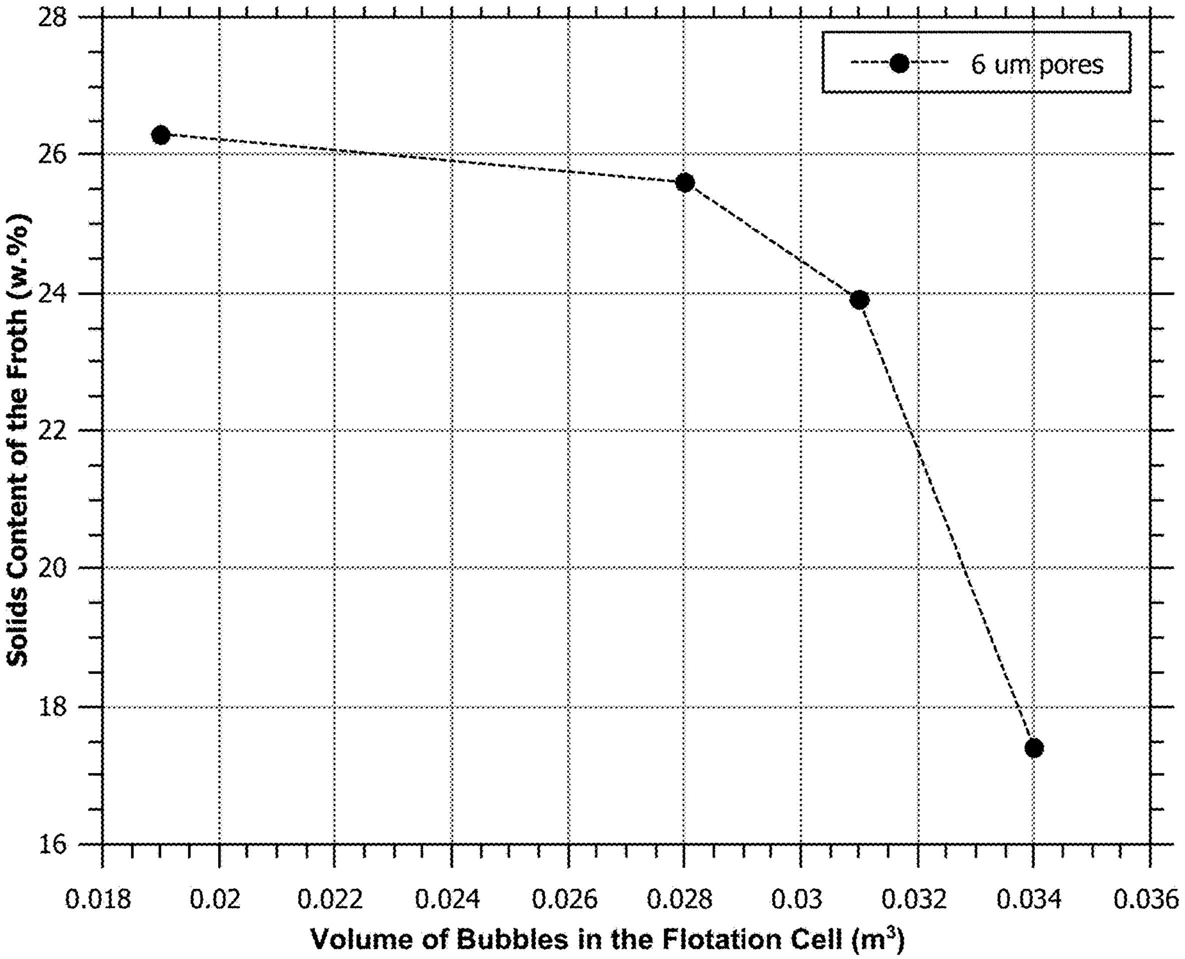
FIG. 13 is a graph of the solids content of the coal-froth as a function of the bubble volume in the flotation cell.

FIG. 13 shows the solids content of the coal-froth as a function of the bubble volume in the flotation cell. Bubble volume, which also represents the number of bubbles, in the flotation cell increased because air was passing through the bubble generators at a higher rate, i.e. greater blower speed (rpm). The increase in air flow rate through the column caused more water to exit the column with the froth, resulting in a wetter froth or lower solids content. Thus, one of the ways to maximize the solids content of the froth is to minimize the air flow rate through the flotation cell while still achieving desired flotation rates.

Example 14

Countercurrent Wash of Coal-Froth

Counter current wash water through the coal-froth layer has become a standard procedure in coal-froth flotation to deliver a lower ash content coal-froth [Kilma 2012, Jameson 2007, and Yoon 1995]. The belief is that the counter current of water washes ash-forming mineral content particles out of the coal-froth and back down into the water-bubble (or pulp) region of the flotation cell. A major reason for high moisture content in the coal-froth in other coal flotation cells is the use high volumes of counter current wash water to reduce entrained ash.

Figure 14:
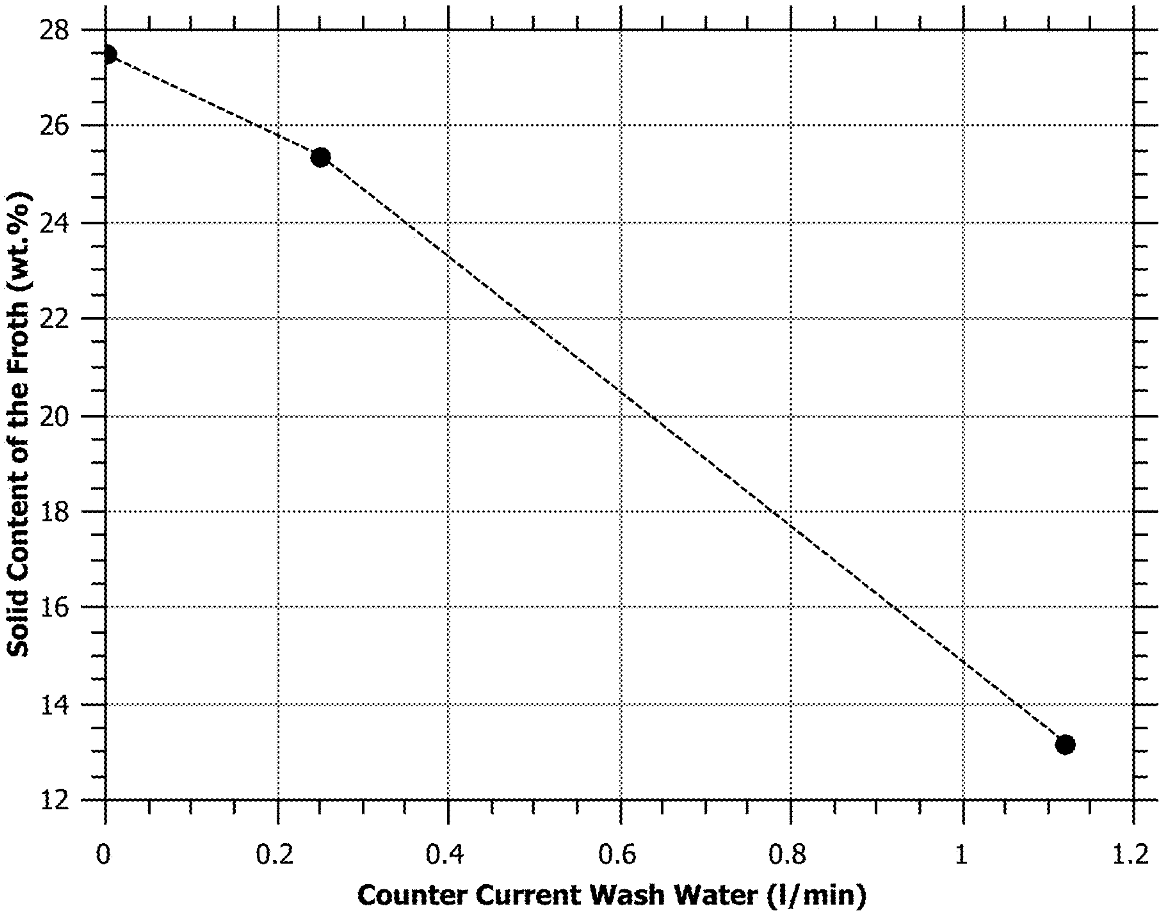
FIG. 14 is a graph of solids content of the coal-froth as a function of counter current wash water.

The data reported in FIG. 14 show that if different rates of counter current wash water addition are added to a 17.5 inch (0.444 m) in diameter by 6 foot (1.83 m) tall flotation cell, the solid content of the froth goes from 27.5 wt. % for no counter current wash water to 25.4 wt. % and 13.2 wt. % for 0.25 l/min and 1.12 l/min counter current wash water respectively. The prevailing belief is that the counter current of water washes ash-forming mineral content particles out of the coal-froth and back down into the pulp region of the flotation cell to increase the flotation efficiency. Yet the experimental results show that as the rate of counter current wash water increases, the solids content of the froth decreases from 27.5 wt. % solids to less than 15 wt. % solids in the above example.

Example 15

Solids Content of Coal-Froth, Flotation Cell Diameter, and Froth Height

Table 3, below, summarizes solid and ash content of the input slurry and the solid and ash content of the outgoing froth for various runs done using the different flotation cells. The four flotation cells used were 17.5 inch (0.444 m) in diameter by 6 foot (1.83 m) tall, 17.5 inch (0.444 m) in diameter by 20 foot (6.1 m) tall, 4 foot (1.22 m) in diameter by 10 foot (3.05 m) tall, and 8.5 foot (2.59 m) in diameter by 14 foot (4.27 m) tall. The four data points for the 17.5 inch (0.444 m) in diameter by 6 foot (1.83 m) tall flotation cell were all collected in the same run. All of the rest of the data points in the Table 3 represent data points from unique flotation runs.

The solid content of the froth showed no trend or dependence on the solid content of the slurry input into the flotation cell. Additionally, for the same diameter flotation cell, the solid content of the froth was only weakly dependent on froth height showing a small increase in solid content with taller froth height. Froth height is defined by the distance from the boundary between the pulp and the froth to the top of the flotation cell a, i.e. the height that the froth must travel to overflow the flotation cell and be collected.

Figure 15:
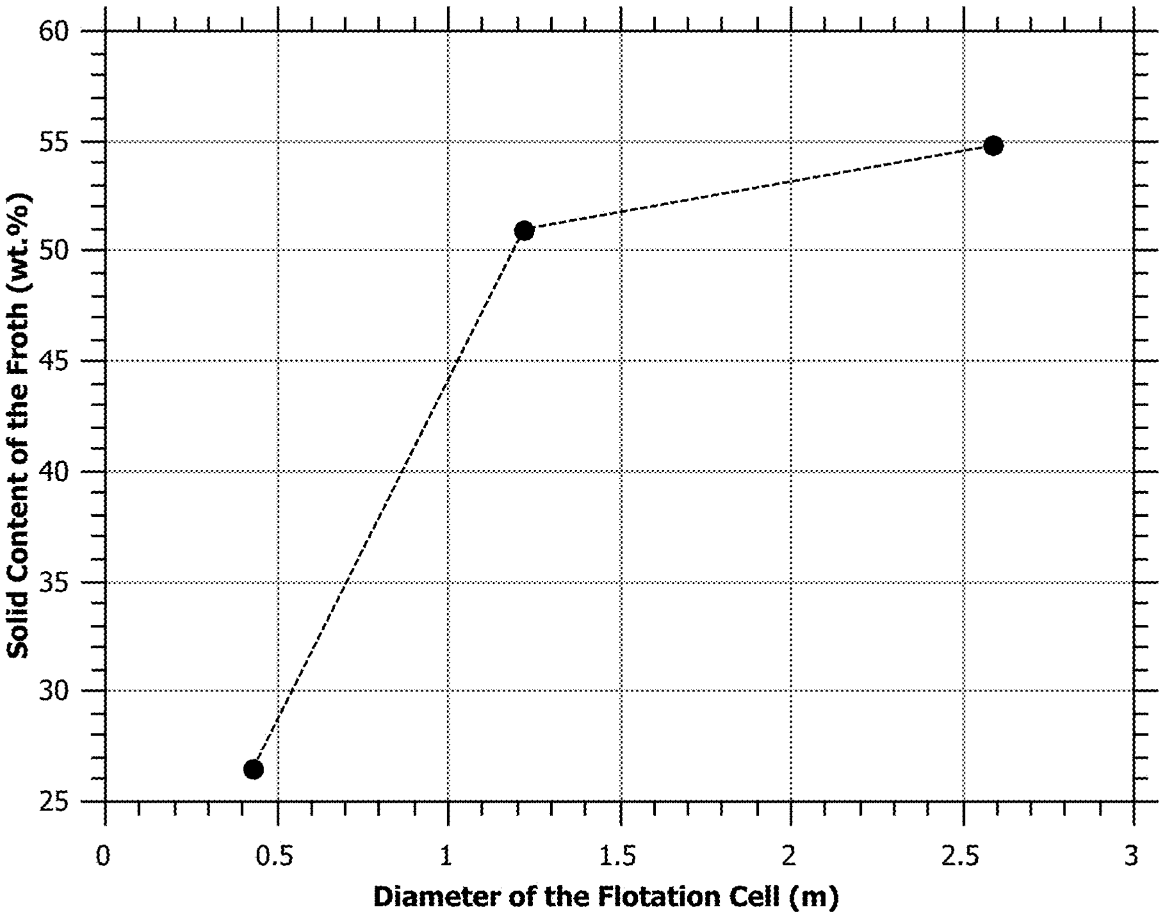
FIG. 15 is a graph of the solid content of the coal-froth as a function of the flotation cell diameter.

Interestingly, the solid content of the froth was strongly dependent on the diameter of the flotation cell. The solid content of the coal-froth was plotted verses diameter of the flotation cell diameter in FIG. 15. Solid content increased as flotation cell diameter increased. Thus, the solids content of the coal-froth can be dictated by the diameter of the flotation cell, reaching solid content levels in excess of 50 wt. % solids.

High solid content froth is desirable for at least two reasons. First, the coal-froth is subsequently dewatered to produce a dry upgraded coal product. The higher the solids content of the coal-froth, the less water needs to be removed from the coal-froth in dewatering processes. Coal-froth is usually dewatered via methods such as filter presses, vacuum filtration systems, belt presses, etc. Other coal-froth flotation systems of fine and ultrafine coal produce coal-froth in the 12 wt. % solids range. De-watering a low solid content coal-froth such as that requires more equipment than if the coal-froth were a higher solid content, e.g. 50 wt. % solids produced by the flotation technology and process described herein. Second, ash-forming mineral content particles are entrained in the pulp water that is included in the froth. A higher solid content means less pulp water is included in the froth, meaning less ash-forming mineral content is included in the froth, resulting in higher flotation efficiency.

At the pulp-froth interface, fine bubbles coalesce to form larger froth bubbles. Water from the pulp is entrained in the coal-froth interstitial to the bubbles themselves. The large bubbles of froth area forced upward and out of the flotation cell by new froth forming at the pulp-froth interface. Near the pulp froth interface, the interstitial water between the large froth bubbles can drain via gravity through the coal-froth back down into the pulp of the flotation cell. The use of counter current wash water takes advantage of this drainage mechanism. Intuitively, a taller coal-froth height would give more time and distance for the froth to drain, allowing as much water as possible to return to the pulp and produce the driest froth possible. While it is true that the data in Table 3 shows that a taller coal-froth height did produce a dryer froth (higher solids content), as already stated, the data further shows that the diameter of the column had a much larger effect on the solids content of the coal-froth than the height of the froth.

Standard flotation cells in industry currently operate with a coal-froth height of about 1 meter. One reason for the tall froth height is to maintain a stable froth that does not collapse while applying the counter current of wash water to filter through the froth and be an effective froth washing step [Yoon 1995, Kilma 2012]. The surprising result that a dryer coal-froth is produced with a larger diameter flotation cell resulted from the scale-up efforts from the small diameter flotation columns at the lab-scale to larger diameter flotation columns at the pilot-scale and production-scales in the absence of counter current wash water. Wash water is not needed with the flotation technology and process described herein to obtain a flotation efficiency in excess of 95%, e.g. less than 5 wt. % ash-forming mineral content in the coal-froth product on a dry basis. If high counter current wash water rates had been employed during scale-up efforts, the trend for greater solid content with larger diameter flotation cells would likely not have been observed. Furthermore, froth solid contents greater than 15 to 20 wt. % would likely not have been achieved, especially if larger counter current wash water rates would have been used. Since no counter wash water was used and froth height has a minimal influence on froth solid content, solid content in excess of 50 wt. % was achieved with a flotation cell 8 feet in diameter while keeping the froth height less than 18".

Without being bound by theory, it is presently believed the reason the diameter of the column is more important than froth height in determining the solids content of the froth is because of drainage rate of the froth within the flotation cell based on random walk theory. In the smaller diameter flotation cells, the number of pathways for interstitial water drainage back into the flotation cell is restricted by the closer proximity of the walls of the flotation cell. Further, the data shows that for a given flotation cell diameter, increasing the coal-froth height above about 18 inches (0.45 m) does not have a significant influence on the solid content of the froth. This is likely because the drainage process is very fast resulting in the solid content limit for a given flotation cell diameter to be reached almost immediately and any further drainage of water as the froth raises in the flotation cell is replaced by water draining down from the froth from above. The result being an equilibrium solids content for a given flotation cell diameter that increased slightly with coal-froth height above the pulp-froth interface as the froth was pushed out of the flotation cell.

It is important to highlight that the solid content of the coal-froth is one factor that influences the ash-forming mineral content of the froth. As discussed earlier, a wetter froth contains more water from the pulp. The ash-forming mineral content particles in the froth are not floated on the bubbles, but rather they are included in the coal-froth as part of the interstitial water from the pulp during froth formation. Thus, as the solid content of the froth is increased by increasing froth drainage with larger diameter flotation cells, the ash-forming mineral content of the froth is reduced through inclusion of less water from the pulp.

Additionally, the data in Table 3 shows that the ash-forming mineral content of the coal-froth on a dry basis for a given cell diameter is independent of froth height. As discussed herein, the ash-forming mineral content is a function of the operation of the flotation cell. Once the coal-froth is produced at the pulp-froth boundary and the water has drained to the equilibrium level for the flotation cell diameter as discussed above, the ash-forming mineral content on a dry basis for the quantity of froth produced at that moment is a constant and does not change as the froth raises further in the flotation cell. As discussed earlier, the ash-forming mineral content amount for the quantity of froth produced at that moment is a function of how much ash-forming mineral content has built up in the flotation cell during the time the cell has been operating in the given batch cycle.

As stated earlier, the four data points for the 17.5 inch (0.444 m) in diameter by 6 foot (1.83 m) tall flotation cell were all collected in the same run. The total froth height for this run was set at 3 ft., e.g. the distance from the pulp froth interface to the top of the column was three feet. All of this data was collected almost immediately after beginning the flotation. Vessels were suspended in the flotation cell at froth heights of 0.5 ft., 1.25 ft., and 2 ft. When the froth reached each height after starting the flotation, the vessel filled with froth. After the froth surpassed this level and the vessel was full, it was removed from the flotation cell with an attached string. Froth was collected at last froth height of 3 ft. as the froth began to spill over the top of the flotation cell. The results of this controlled experiment show two of the observations just described: ash-forming mineral content does not change after froth formation at the pulp-froth boundary and weak dependence of solid content on froth height. The low ash-forming mineral content of the froth for these four data points from the 17.5 inch (0.444 m) in diameter by 6 foot (1.83 m) tall flotation cell is because the flotation cycle was just started. Higher ash-forming mineral contents are shown for other data points in the Table 3 because the froth samples were samples of all the froth produced during a 30 to 40 minute run (except the 2 ft. froth height in the 8.5 foot (2.59 m) in diameter by 14 foot (4.27 m) tall flotation cell which was collected using a vessel on a string immediately after starting the flotation as the froth advanced up the flotation cell).

Thus, the ash-forming mineral content of the froth is a function of the instantaneous solids content and ash-forming mineral content of the pulp at the moment the froth forms at the pulp-froth interface.

TABLE 3

Solid and ash content of the input slurry and solid and ash content of the outgoing froth for four different flotation cells.

| Flotation Cell | Solid Content of Slurry (wt. %) | Ash Content of Slurry (X wt. %) | Froth Height (ft.) | Solid Content of Froth (wt. %) | Ash Content of Froth (wt. %) | Ash Reduction (% X) |
|---|---|---|---|---|---|---|
| 17.5" × 6' | 38.7% | 25.5% | 0.5 | 26.5% | 2.7% | 11 |
| 17.5" × 6' | 38.7% | 25.5% | 1.25 | 30.7% | 2.8% | 11 |
| 17.5" × 6' | 38.7% | 25.5% | 2 | 32.1% | 2.4% | 9 |
| 17.5" × 6' | 38.7% | 25.5% | 3 | 30.7% | 2.8% | 11 |
| 17.5" × 20' | 53.0% | 25.0% | 6 | 30.2% | n/a | n/a |
| 17.5" × 20' | 53.0% | 25.0% | 6 | 33.9% | n/a | n/a |
| 17.5" × 20' | 53.0% | 25.0% | 12 | 35.0% | n/a | n/a |
| 4' × 10' | 35.0% | 25.0% | 4 | 51.1% | 4.13% | 17 |
| 8.5' × 14' | 57.0% | 28.2% | 1.5 | 55.0% | 4.80% | 17 |
| 8.5' × 14' | 57.0% | 28.2% | 2 | 54.8% | 2.37% | 8 |
| 8.5' × 14' | 57.0% | 28.2% | 6 | 67.4% | 5.09% | 18 |

In some embodiments, for a given amount (X wt. %) of slurry ash-forming mineral content, the ash-forming mineral content of the coal-froth was less than 10% X. In other embodiments, the ash-forming mineral content of the coal-froth was less than 20% X. Other embodiments disclosed herein disclose the ash-forming mineral content of the coal-froth less than 30% X. Still other embodiments disclose the ash-forming mineral content of the coal-froth less than 40% X. Yet other embodiments disclose the ash-forming mineral content of the coal-froth less than 50% X.

Example 16

Batch Processing to obtain high combustible recovery, high efficiency, and a flotation rate at or near the carrying capacity of the flotation cell.

As described herein, a preferred process for operating a coal flotation cell is via a batch process. Data was collected operating a lab-scale flotation cell 17.5 inch (0.444 m) in diameter by 6 feet (1.83 m) tall. A blower was used to supply air to the bubble generators through the manifold described previously that contain bubble generators. For 25 bubble generators with 6 μm pores, 15 cubic feet per minute (CFM) of air was generally supplied to the manifold with the blower, but other air flow rates were tested. To start the batch cycle, the blower was turned on at the desired flow rate. Then the flotation cell was filled with water to 1.2 m level. A spike of frother equivalent to the dosage of 20.3 g frother per cubic meter of water in the flotation cell was added to stabilize bubbles. The volume used to calculate frother spike dosage was that of the cell up to the 1.52 m line. The water was then added until the pulp (water bubble region) was at the 1.52 m level of the flotation cell.

Usually, a 45 wt. % solid aqueous slurry of coal fines was used for flotation, but slurries as low as 15 wt. % solid and as high as 55 wt. % solid were tested. Usually, a collector and frother were mixed into the slurry at a dosage of 0.3 kg collector or frother per MT of dry carbon in the slurry. Sometimes lower or higher dosages of collector and/or frother were added to the slurry. The feed rate of the slurry was generally about 5 kg/min, although higher and lower feed rates were tested. The slurry was usually fed into the column for 30 minutes, although shorter and longer times were at times used. During the 30 minute feed time, coal-froth usually started spilling over the top of the column after about two minutes. The slurry feed was stopped after 30 minutes, and a clean-up period allowed carbon remaining in the pulp to float out. If the slurry feed rate introduced coal particles at a rate much higher than the carrying capacity of the flotation cell (e.g. the maximum flotation rate of the flotation cell) then the cleanup time was needed for coal particles that accumulated in the pulp to be floated and collected as coal-froth.

If the slurry feed rate introduced carbon particles into the flotation cell at a rate lower than the carrying capacity of the flotation cell, then little or no cleanup time was needed for coal-froth to quit overflowing the flotation cell after the slurry feed was turned off. The clean-up time was no more than 10 minutes.

If the clean-up time exceeded 10 minutes, the flotation step ended. Ideally the aqueous slurry feed rate introduced carbon particles into the flotation cell in slight excess to the carrying capacity such that a clean-up time of 3 to 5 minutes was needed. When coal-froth stopped spilling over the top of the flotation cell or when the cleanup time reached 10 minutes, whichever was less, the pulp was drained from the flotation cell and saved for analysis. Any sedimentation that accumulated at the bottom of the flotation cell was saved for analysis. The coal-froth that overflowed the flotation cell was saved for analysis. A sample of the slurry was also saved for analysis. Common analysis done on the aqueous slurry of coal fines, coal-froth, pulp (or underflow or tailings), and sediments included total mass consumed or produced, moisture content, ash content, and particles size analysis. From these data, combustible recovery, flotation efficiency, and flotation rate were determined. The tailings (drained pulp) were collected, dewatered, and dried for use in further processing. The collected coal-froth was dewatered, pelletized, dried further and then sometimes further analyzed for heat content, volatile matter content, ash content, sulfur content, and coking properties such as FSI, fluidity, plasticity, CRI, CSR, mean max reflectance, etc. Flotation rates as high as 2.0 MT/m$^3$ flotation cell area, combustible recovery as high as 97%, and flotation efficiency as high as 97% were obtained in the lab-scale flotation cell 17.5 inch (0.444 m) in diameter by 6 feet (1.83 m) tall.

Example 17

Operation of Different Size Flotation Cells

Experimental data was collected in a laboratory scale flotation cell that was 17.5 inches (0.44 m) in diameter by 6 foot (1.83 m) tall. Pilot scale (4 foot (1.22 m) in diameter by 10 foot (3.05 m) tall) and production scale (8.5 foot (2.59 m) in diameter by 14 foot (4.27 m) tall) flotation cells were also operated on multiple occasions for up to 5 hours. Table 4 compares the typical operating results for the three different flotation cells. All of these results are for slurry feed times between 30 minutes to 45 minutes for the same slurry feed rate, slurry solid content, slurry ash content, and particle size range. As can be seen, the ash content of the froth, Btu/lb, FSI, and ash content of the tails are all very similar. As discussed earlier, the solid content of the coal-froth increased with increasing flotation cell diameter. Combustible recovery was measured for a laboratory scale flotation cell that was 17.5 inches (0.44 m) in diameter by 6 foot (1.83 m) tall and was routinely as high a 97%. Although the combustible recovery was not measured directly for the pilot scale and production scale flotation cell, as discussed earlier, the combustible recovery can be calculated based on the ash content of the tailings. The calculated combustible recovery was greater than 95% for both the pilot and production scale flotation cells. The results shown in Table 4 and discussed herein demonstrate that the flotation characterization results performed on the lab-scale flotation cell, scale to a pilot scale and production scale flotation cells.

TABLE 4

| | Flotation Cell Class | | |
|---|---|---|---|
| | Laboratory Scale | Pilot Scale | Production Scale |
| Solids Content of Slurry (wt. %) | 45 | 45 | 45 |
| Ash Content of Slurry (wt. %) | 25 | 25 | 25 |
| Ash Content of Froth (wt. %) | 6 | 4.13 | 3.05 |
| Heat Content of Froth (BTU/lb) | 15255 | 15266 | 15218 |
| FSI of Froth (%) | 8 | 7.9 | 8 |
| Ash Content of Tails (wt. %) | 89.9 | 86.1 | 87.1 |
| Measured Combustible Recovery (%) | 97.0 | n/a | n/a |
| Calculated Combustible Recovery (%) | n/a | 95.4 | 95.6 |
| Slurry Feed Rate (kg/min) | 5 | 37.6 | 170 |
| MTPH dry product based on Slurry Feed Rate | 0.02 | 1 | 4.6 |

Observations

Ash content of the tailings exceeding 90 wt. % on a dry basis can be obtained using the flotation cell and flotation process described herein. Ash-forming mineral content of the froth can be less than 50 wt. %, less than 40 wt. %, less than 30 wt. %, less than 20 wt. %, and even less than 10 wt. % of the ash-forming mineral content of the slurry.

The data suggests that coal particles larger than 500 μm do not float when using microporous ceramic and plastic bubble generators with average pore sizes between 3 μm and 30 μm. When the slurry is milled or sieved such that the particles size are less than 500 μm, no coal sediments were collected suggesting that all of the carbon can be floated by the bubble sizes being produced by the disclosed bubble generators.

Combustible recovery of at least 90%, at least 93%, at least 95%, and at least 97% can be achieved using the flotation cell and flotation process described herein.

Average particle size of the coal-froth can be tuned by changing the pore size of the bubble generators.

Carrying capacity increases as particle size decreases in the fine and especially in the ultrafine size ranges.

Ash content of the coal-froth is affected by the solid content (ash content) that builds up in the pulp during the slurry feed time of the continuous batch-like flotation process described herein.

Moisture content of the froth is affected by the diameter of the flotation column and the rate at which air flows through the column.

Lab scale characterization data scales to pilot and production scale flotation columns.

From the foregoing description, it will be appreciated that the disclosed invention provides an efficient process to separate fine coal particles from ash-forming mineral content particles.

The disclosed process requires substantially less water compared to current commercially available processes resulting in lower operating costs and capital facilities costs.

The disclosed process enables the recovery of fine coal particles to be processed into upgraded, commercially valuable coal products. Similarly, the disclosed process enables the recovery of ash-forming mineral content particles.

The described embodiments and examples are all to be considered in every respect as illustrative only, and not as being restrictive. The scope of the invention is, therefore, indicated by the appended claims, rather than by the foregoing description. All changes that come within the meaning and range of equivalency of the claims are to be embraced within their scope.

The invention claimed is:

1. A coal-froth product and a tailings product made simultaneously from an aqueous slurry of solid coal fines, wherein the solid coal fines consist of discrete particles of coal and discrete particles of ash-forming mineral content having an average particle size less than 40 μm, wherein the coal-froth product comprises bubbles and a solids content of at least 15 wt. % and contains predominantly particles of coal representing a combustible recovery of at least 90% relative to the discrete particles of coal present in the aqueous slurry of solid coal fines, and wherein the tailings product has a solids content containing predominantly particles of ash-forming mineral content.

2. The coal-froth product and tailings product according to claim 1, further comprising a frother in the aqueous slurry of coal fines to aid separation of the coal-froth product and tailings product.

3. The coal-froth product and tailings product according to claim 1, further comprising a collector in the aqueous slurry of coal fines to aid separation of the coal-froth product and tailings product.

4. The coal-froth product and tailings product according to claim 1, wherein the coal fines consist of discrete particles of coal and discrete particles of ash-forming mineral content having an average particle size less than 20 um.

5. The coal-froth product and tailings product according to claim 1, wherein the combustible recovery of the coal-froth product is at least 95%.

6. The coal-froth product and tailings product according to claim 1, wherein the coal-froth product has a solids content of at least 20 wt. % solid particles.

7. The coal-froth product and tailings product according to claim 1, wherein the coal-froth product has a solids content of at least 25 wt. % solid particles.

8. The coal-froth product and tailings product according to claim 1, wherein the coal-froth product has a solids content of at least 30 wt. % solid particles.

9. The coal-froth product and tailings product according to claim 1, wherein the coal-froth product has a solids content of at least 35 wt. % solid particles.

10. The coal-froth product and tailings product according to claim 1, wherein less than 8 wt. % of the solid particles in the coal-froth product are ash-forming mineral content particles.

11. The coal-froth product and tailings product according to claim 1, wherein the aqueous slurry of coal fines further comprises a separation aid selected from a frother and a collector to aid separation of the coal-froth product and tailings product, wherein the coal fines consist of discrete particles of coal and discrete particles of ash-forming mineral content having an average particle size less than 20 μm, and wherein the coal-froth product has a solids content of at least 20 wt. % solid particles.

* * * * *